United States Patent [19]

Lindenbaum

[11] Patent Number: 4,601,444
[45] Date of Patent: Jul. 22, 1986

[54] AERIAL LOAD-LIFTING SYSTEM

[76] Inventor: Bernard Lindenbaum, 4929 Thorain Ct., Dayton, Ohio 45416

[21] Appl. No.: 502,324

[22] Filed: Jun. 8, 1983

[51] Int. Cl.⁴ .............................................. B64B 1/30
[52] U.S. Cl. .......................................... 244/26; 244/2
[58] Field of Search .................... 244/2, 3, 24, 25, 26, 244/27, 28, 29, 30, 31, 127, 17.23, 137 A

[56] References Cited

U.S. PATENT DOCUMENTS

| | | | |
|---|---|---|---|
| 361,855 | 4/1887 | Beeson | 244/28 |
| 1,430,393 | 9/1922 | Lynde | 244/30 |
| 1,546,803 | 7/1925 | Sternberg | 244/2 |
| 2,180,922 | 11/1939 | DeBothezat | 244/17.23 |
| 2,475,839 | 7/1949 | Jalbert | 244/24 |
| 3,008,665 | 11/1961 | Piasecki | 244/2 |
| 3,113,747 | 12/1963 | Smith | 244/3 |
| 3,946,971 | 3/1976 | Chadwick | 244/137 A |
| 4,267,987 | 5/1981 | McDonnell | 244/2 |

FOREIGN PATENT DOCUMENTS

| | | | |
|---|---|---|---|
| 2922059 | 12/1979 | Fed. Rep. of Germany | 244/29 |
| 391074 | 10/1908 | France | 244/26 |

OTHER PUBLICATIONS

"Hybrid Aircraft for Heavy Lift", J. B. Nichols and D. B. Doolittle, paper presented to the 30th Annual Nat. Forum of the A.H.S., Wash., D.C., May 1974.
"USAF Eagle Designed for Longevity", McDonnell-Douglas publication.

Primary Examiner—Trygve M. Blix
Assistant Examiner—Rodney Corl
Attorney, Agent, or Firm—Becker & Becker, Inc.

[57] ABSTRACT

An aerial load-lifting system comprised of a lighter-than-air unit, such as a blimp, below which is suspended a powered heavier-than-air unit, such as a helicopter, for example. The latter unit produces thrust which can be directed vertically, up or down, or tilted for translational motion in any direction. The units are connected by a flexible tension member such as a cable. The upper, lighter-than-air unit is sufficiently high above the lower, heavier-than-air unit to permit the heavier than-air-unit to freely control and maneuver itself and the payload suspended below it with minimal restraint from the lighter-than-air units.

9 Claims, 19 Drawing Figures

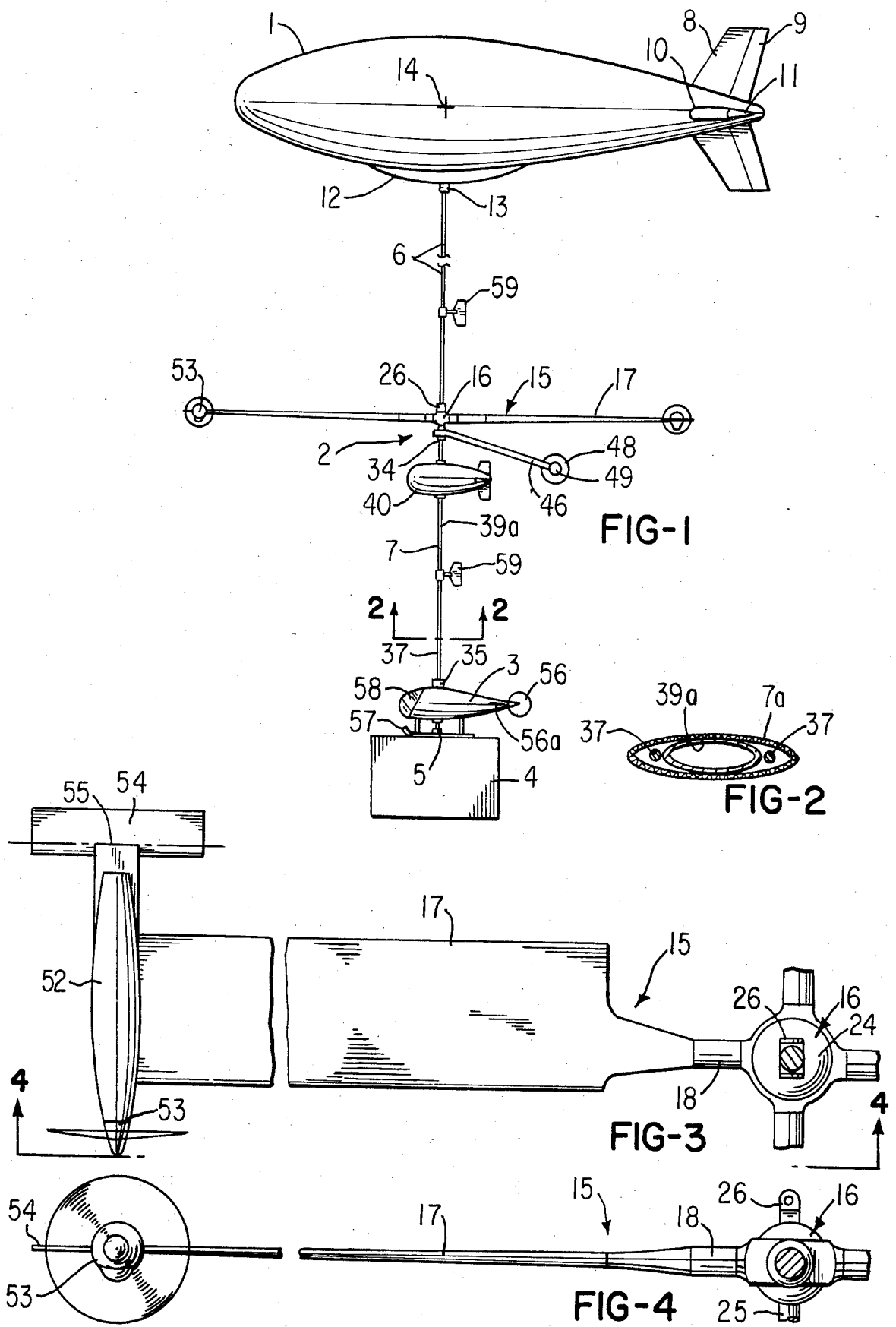

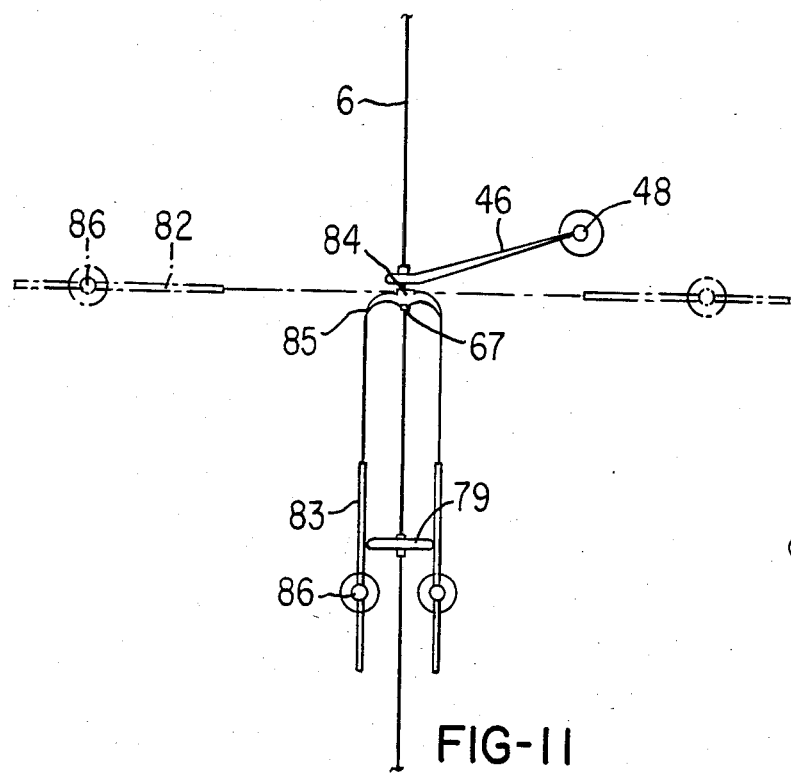
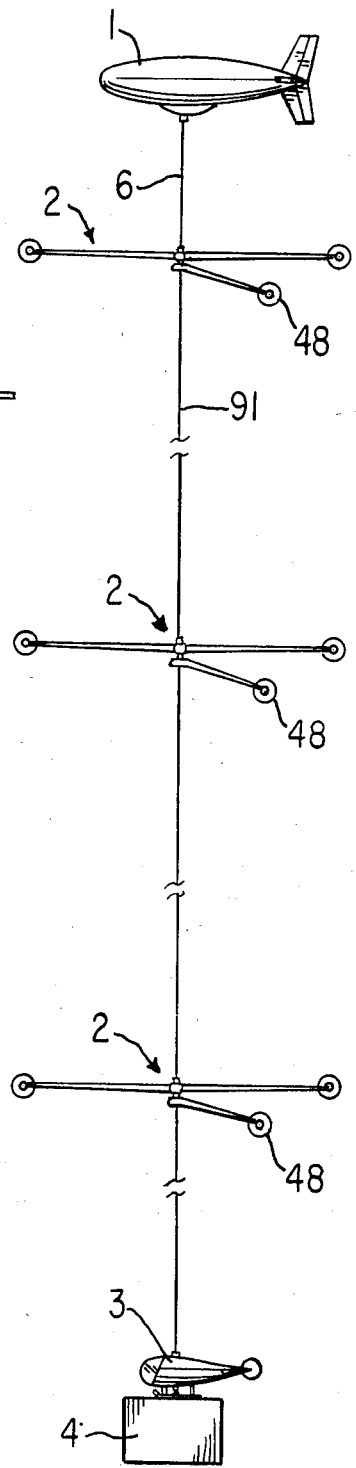
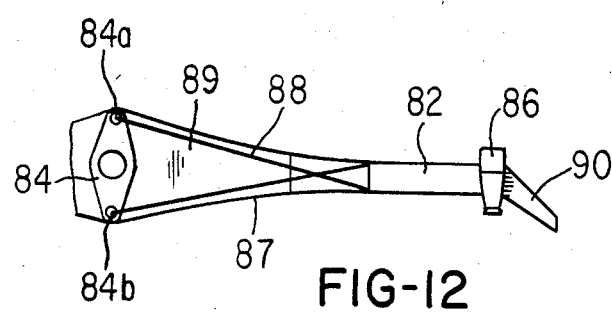
FIG-11
FIG-12
FIG-13

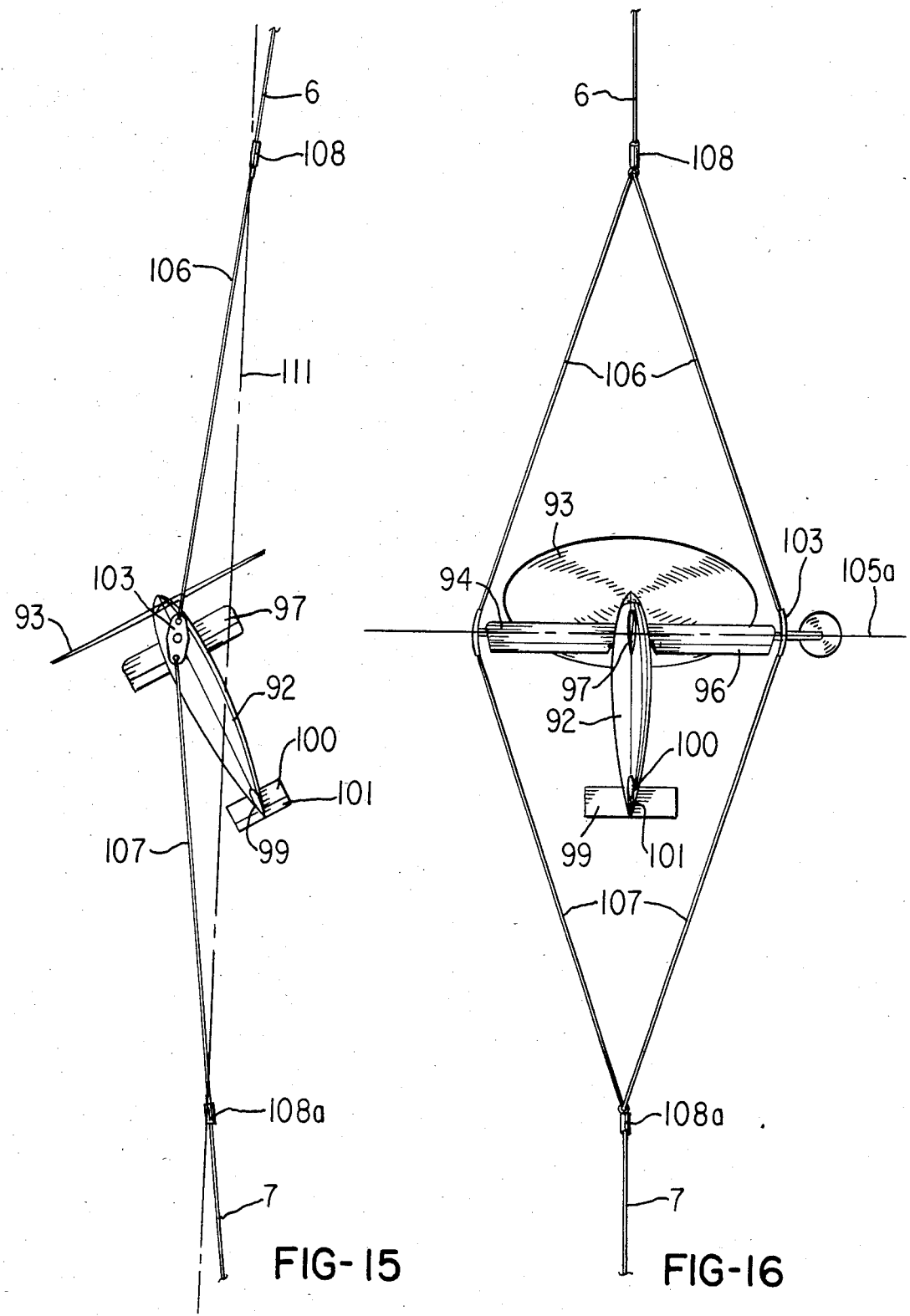

AERIAL LOAD-LIFTING SYSTEM

BACKGROUND OF THE INVENTION

The need for vertically lifting heavy or bulky loads and transporting them over long distances has far outgrown conventional devices whereby these loads may be raised from the ground, placed on vehicles, and moved to new sites. This is particularly true where lack of roads makes such operations very difficult or very expensive; for example, removing trees from forests to bring them to a logging site or to a sawmill. Other important uses include hauling cargo between ship and shore, moving large structures such as bridge segments, and transporting houses and other buildings, manufactured in factories, to specific sites.

DEFINITIONS

Before further describing the invention, it will be helpful to define the special aeronautical terms used hereinafter:

Aircraft—Any weight-carrying machine or structure for flight in or navigation of the air that is supported either by its own buoyancy or by aerodynamic action of the air against its surfaces. Airplanes, helicopters, balloons and airships all are aircraft.

Airship—A lighter-than-air (LTA) aircraft having a propelling system and a means for controlling the direction of motion.

Balloon—A non-porous bag of tough, light material filled with heated air or a gas lighter-than-air so as to rise and float in the atmosphere; an aerostat without a propelling system.

Collective Pitch Change—A blade-angle change imposed on all blades simultaneously and in equal amount, usually used to produce a change in rotor thrust.

Cyclic Pitch Change—A blade incidence angle change which varies once per revolution and is used to tilt the rotor thrust vector or produce moments at the rotor hub.

Helicopter—A form of aircraft whose support in the air is derived solely from the reaction of a stream of air driven downward by one or more lifting rotors revolving about a vertical axis.

Helicopter Rotor—A rotor which operates with its rotational axis in near-vertical attitude, designed to produce lift and, when inclined, to produce both lift and propulsive force.

Hybrid Aircraft—An aircraft composed of major elements taken from LTA and HTA aircraft.

Propeller—A form of rotor designed primarily to provide propulsion of the aircraft, as opposed to lift; its rotational axis is normally parallel to the longitudinal axis of the aircraft.

Prop-rotor—A specific form of rotor used on VTOL aircraft to provide both lift and propulsion during vertical and low speed flight and primarily propulsion during higher speed flight, this change being accomplished by tilting the rotor axis between vertical and horizontal orientations.

Rotor—A system of rotating airfoils or wings, arranged to produce thrust or lift.

VTOL—Vertical take-off and landing.

Lighter-Than-Air Aircraft—An aircraft supported by its own buoyancy, such as a balloon or an airship.

Heavier-Than-Air Aircraft—An aircraft supported by aerodynamic action against its surfaces, such as a helicopter, a propeller-driven or jet-driven airplane, or a VTOL airplane.

PRIOR ART STATEMENT

Background References

1. U.S. Pat. No. 3,856,236, Doolittle "Aerocrane".
2. U.S. Pat. No. 3,976,265, Doolittle "Aerocrane".
3. Paper presented at the 30th Annual National Forum of the American Helicopter Society, 1974, "Hybrid Aircraft for Heavy Lift", John Nichols, D. B. Doolittle.
4. *Airforce Magazine,* February 1983, pp. 94–95.
5. *Popular Science Magazine,* November 1981, pp. 72–74, "Workhorse Copter—blimp" (Piasecki Aircraft Co.)
6. Goodyear Magazine *Profile,* Spring 1977 (Goodyear Aerospace Co.)
7. *Aviation Week & Space Technology Magazine,* June 21, 1976, pp. 48–52, "Hybrid Heavy-Lift Airships Under Study" (Goodyear Aerospace Corp.)
8. *Science and Mechanics Magazine,* January–February 1983, pp. 33–36 and p. 106, "New Airship Era Dawning" (Van Dusen Development Corp.)
9. *Aviation Week & Space Technology Magazine,* November 30, 1981, p. 60, "Airship Prototype Rolled Out" (Van Dusen Development Corp.)

Aircraft capable of vertical take-off and landing (VTOL) and hovering such as the helicopter, offer flexibility of operation and utility which makes them very useful in many fields such as logging, various kinds of construction, military and commercial transport, fire fighting, etc. VTOL aircraft fall into two broad categories; heavier-than-air (HTA), which includes VTOL airplanes and helicopters; and lighter-than-air (LTA), that is balloons and airships. LTA aircraft are very efficient vertical lifters since they do not require power to do this, further, for a given vertical lift capability, LTA aircraft are less costly to build and operate than HTA VTOL types and can be built to lift very large loads. When provided with conventional propulsion devices (e.g. propellers) airships can be maneuvered slowly but lack the precision of control and movement needed for many VTOL operations. In addition, they generally require ground crews to help them land and to be positioned for mooring. While the HTA types, particularly helicopters, can have excellent vertical flight and low speed maneuvering capability and precision control they are relatively expensive to build and to operate. At present, they are difficult to build in very large sizes.

In recent years there has been increasing interest in combining LTA aircraft with propulsion elements from VTOL aircraft, such as tilting propellers and rotors, to create hybrid aircraft aimed at obtaining the benefits of both types—more economically efficient vertical lifting capability and satisfactory maneuverability. The idea is not new; airships of the past such as the U.S.S. Macon and Akron were equipped with swivelling propellers to improve their maneuverability. All of these approaches have a similar purpose, to move the LTA aircraft itself to a selected position and attitude and do this by applying force directly to the hull itself.

The principal hybrid types aimed at VTOL, which are being explored at present or which have been explored in the recent past, are described in the Background References. Fundamentally, all of these aircraft attempt to control the attitude and position of the LTA unit itself during vertical and low speed flight by applying forces and moments directly to the hull. Both Piasecki and Goodyear (References 5, 6) use helicopters components (tilting rotors or complete helicopters) mounted on a frame which is attached directly to the airship hull. Doolittle, in the "aerocrane" (References 1, 2, 3), surrounds the inner portion of a helicopter type rotor system with a spherical gas bag so that the active portions of the blades protrude radially from the bag in the area of its equator. The gas bag rotates with the rotor blades. A later concept by Doolittle (Reference 4) called the Cyclo-Crane, uses a horizontally-oriented, blimp-shaped gas bag with helicopter-like blades protruding at right angles from the bag. Moveable plates or "cyclogiro" type wings in addition to engines and propellers are attached to the blade tips. Rotation of the entire assembly—gas bag, rotor blades, tip plates, engines and propellers about the gas bag's longitudinal axis is used to provide vertical lift and full control during vertical, hover and low speed flight.

While the application of force directly to the gas bag or hull for control can be made to work, it will be appreciated that the large bulk of the hull makes response slow and precise control difficult, particularly in winds, and that the forces required for control are relatively large and are a function of this bulk. It is still an open question whether the current efforts will prove successful in obtaining acceptable hover and low speed control and maneuverability for the proposed hybrid aircraft. Piasecki (Reference 5) and Aerolift Inc. (Reference 4) are in the process of completing demonstrator aircraft which may provide answers in the near future.

Hybrid aircraft can be designed with any desired degree of buoyancy ranging from that which, when the aircraft is completely unloaded (empty weight condition), is incapable of taking off without using dynamic lift, to one where the buoyancy is entirely sufficient to carry the full gross weight. In the latter case the dynamic force elements are used solely for control and maneuver and not to carry any part of the payload. Maneuvering of the aircraft requires that adequate dynamic force be available, whether positive or negative and this force should be tiltable to provide horizontal components. In most of the proposed hybrid aircraft both negative and positive dynamic force is used; the buoyant force carries a portion of the payload weight and the dynamic lift carries the remaining portion. When operating without payload negative dynamic lift is used to hold the overly buoyant aircraft in position. Thus, control is available when the aircraft is loaded or unloaded and the need to carry ballast and valve lifting gas for vertical height control is eliminated. This is a most important improvement in airship operational utility.

Unless the dynamic force vector can be fully tilted 90 degrees from vertical to horizontal, or a separate horizontal force generator is available, it is not possible to accelerate the aircraft into translational flight at constant altitude when the aircraft is neutrally buoyant. Helicopter rotors operating through relatively small tilt angles create such a problem for hybrid aircraft when neutrally buoyant; independent means have been incorporated to provide horizontal thrust. Piasecki uses conventional propellers mounted at the tail of each helicopter for this purpose.

Page 2 (FIGS. 1 and 2) of Background Reference 3 illustrates the principle (hypothetical), use of a balloon in conjunction with a conventional helicopter for lifting. The authors of Reference 3 conclude that ". . . it would obviously be impractical to have a separate balloon and helicopter connected by a cable. One need only ask how the system would react if the balloon were punctured and settled down over the turning rotor." The authors continue with: "The separate elements must, of course, be integrated into a single hybrid vehicle." This reference clearly abandons the concept of these *separate* units, the authors instead relying on a *combined* unit such as shown in FIG. 3 of Reference 3 to accomplish their purpose. However, the present invention is directed to the concept of separate interconnected units rejected by the authors of this reference.

SUMMARY

My invention, therefore, takes an entirely different approach than that used by all the other hybrids; it is based on the elimination of direct control of the lighter-than-air (LTA) unit. This is done by dividing the hybrid vehicle into separate primary components, the key ones being a LTA (upper) unit and a heavier-than-air (lower) unit of the vertical take-off and landing (VTOL) type (airplane or helicopter) that is capable of producing large vertical forces during hover and vertical flight and which can tilt these forces for translational motion in any direction. These units thus form an entirely new type of hybrid aircraft which functions as an aerial load-lifting system. By separating these two units physically and connecting them with a flexible tension member of some length, such as a cable, the need is eliminated to precisely maneuver or control the position of the LTA unit. Precise position control and maneuvering are applied only to the VTOL unit and payload. I have chosen to call this concept the *Lifting Line Aircraft Concept*, acronymn *LiLAC*. With a suitable line length the LTA unit will float freely at a substantial height above the VTOL unit with each unit providing a part of the total lift during all flight modes from hover through cruise. Control is applied to the VTOL unit to obtain precise position of the unit and the payload; the influence of the LTA unit's movements on the VTOL unit, such as produced by winds, is substantially reduced, particularly if the cable is attached to the VTOL unit by means which limit the moments imposed on the VTOL unit by the pull of the flexible tension member. If the LTA unit is of streamline shape and has stabilizing tail fins, it will freely weathercock into any relative wind during all flight modes, minimizing the tension force on the cable. Essentially, the LTA unit will fly kite-like above the VTOL unit. With this system, carriage of ballast and venting of lifting gas (helium) can be eliminated since a controllable vertical force for rising and descending is provided by the VTOL unit. This constitutes a primary objective of my invention.

Another objective of the invention is, therefore, to attach the VTOL unit to the cables (LTA and payload) in such a way as to permit easy tilting of the VTOL unit's thrust force with respect to the cable by limiting the ability of the cables to produce moments on the VTOL unit through attachment devices created for this purpose.

This tilting of the thrust vector is used for control and translational motion. Sustained translational force is used to move the LTA unit as well as the VTOL unit. Depending on the configuration of the VTOL unit and on the method used to attach it to the cable, tilting can be angularly limited or unlimited. Control of the VTOL unit's tilting angle can be obtained through any of several well-known means such as by conventional control surfaces in the thrust producer's slipstream, by application of cyclic blade pitch change to rotors and propellers, by bodily tilting of the thrust producer itself with respect to the VTOL unit's airframe or by tilting of the entire VTO unit with respect to the cable through use of a mechanical drive such as a motor-driven gear system.

An additional objective of the invention is to permit the ready use of large diameter, low disc loading thrust producers to obtain high thrust with the power plants used on the aircraft, these power plants being sized essentially by the power required to obtain a prescribed forward speed, as during cruising flight.

Another objective of my invention is to use the VTOL unit to provide both vertical lift and forward propulsion efficiently. The vertical lift is additive to the lift of the LTA unit; this division of lift can be made to satisfy any desired operating condition. In one such division the LTA unit supports only the weight of the VTOL unit loaded with fuel and crew; the payload being lifted by the VTOL unit. Thus, when the VTOL unit is not operating, the payload essentially keeps the system tethered to the ground. When the payload is removed the entire hybrid aircraft becomes buoyant permitting it to float at altitude on a tether line. This provides a desirable safety feature since jettison of payload during an emergency, such as engine failure, permits the aircraft to remain airborne on buoyant lift alone.

An additional objective of my invention is to allow the easy and rapid substitution of one type of HTA unit by another, different type, e.g. airplane by helicopter, while retaining the same LTA unit. This permits the better satisfying of differing uses of the hybrid aircraft. Examples of such uses are: short haul, heavy lift (helicopter type operations); longer distance, higher speed VTOL cargo and passenger transport (airplane type operations); long range, long endurance operations such as Navy and Coast Guard sea patrol. The basic cable (Lifting Line) system permits the easy interchange of these HTA units which can be VTOL airplane or helicopter type units. Conversely, the system lends itself to replacement of one LTA unit with another of even different size when desired, thus providing a very flexible system to meet differing needs.

Another objective of the invention is to use different arrangements of the Lifting Line to accommodate different types of VTOL airplane units or different helicopter configurations on the cable system. VTOL airplane units can employ any of the known propulsion concepts ranging from those which use "prop-rotors" to those which use pure jet thrust. For reasons of efficiency the prop-rotor types are preferred and these can be of single or multiple prop-rotor configuration using tilting or non-tilting wings. Helicopter systems can use mechanically-driven or tip-driven rotors. Mechanically-driven rotors can be of the single or multiple main rotor type (e.g. twin lateral, tandem, etc.)

Another objective of the invention is to use the Lifting Line as a basis for attaching a single, tip-driven, torqueless helicopter rotor by effectively passing the cable through the hub so that the rotor actually rotates around the cable, with the cable producing little or a selected amount of tilting moment on the hub of the rotor. The method of attachment of the rotor hub to the cable is such as to permit substantial tilting of the rotor plane with respect to the cable, the objective being to accommodate the aftward inclination of the cable without physical interference when the rotor is towing the LTA unit, while still obtaining adequate forward tilt of the rotor necessary for forward flight of the aircraft. The single, tip-driven rotor approach is particularl promising for large diameter, low disc loading rotors since it permits production of vertical lift with relatatively low power and eliminates rotor drive gearing and anti-torque devices. The cable plus LTA unit allows the rotor to be located far enough above any ground obstructions, despite the expected considerable blade droop, to permit starting and stopping without any problems. When desired to eliminate blade root bending loads and stresses and reduce rotor blade weight the Lifting Line concept makes it possible to use horizontally-hinged or flexurally-attached (flapping) blades without the need for droop stops. When not turning the blades hang down along the cable and are kept above any obstructions.

An additional objective of my invention is to use the cable to help stabilize the attitude of the HTA unit. Because of the tension in the cable and the relative steadiness of the LTA unit, which changes its position slowly, the cable provides a good reference for any tilting deviation of the HTA unit. This information, transmitted into the HTA unit's control system, can be used to help stabilize the unit's attitude. Control of the HTA unit and of the LTA unit preferrably will be mainly of the electrical type, commonly known as "fly-by-wire". This permits ready location of the pilot at any position; in the LTA unit, HTA unit or payload pod. Fly-by-wire makes it easier to use the cable attitude for stabilization and also works well with the electronic computers which may be used in the aircraft's control and stabilization systems.

A further objective of the Lifting Line concept is to use the cable to provide vibratory freedom for the helicopter unit, particularly for large diameter, single rotor systems. This arrangement can be used to reduce vibratory inputs to the LTA unit and to a crew/cargo/passenger pod unit hanging below the rotor on the cable.

Another objective of the invention is to permit the attachment of airplane type VTOL units to the Lifting Line in such fashion as to let them tilt their thrust vectors in any direction desired without restriction. This allows the thrust vector to be directed up or down and azimuthally simultaneously at any desired angle to provide position and movement control of the hybrid aircraft.

Another objective of the invention is to use the Lifting Line as a means of attaching a multiplicity of HTA units in tandem, one above the other, below the LTA unit. This permits multiplication of the total lifting capability without requiring the development of new, larger HTA units or a new LTA unit. Such tandem operation of multiple units is similar to the use of tandem railroad locomotives in pulling long, heavily loaded trains. The several HTA units can be identical or different (e.g. VTOL airplane types and helicopter types) if desired to achieve specific operational capabilities. In this multiple HTA unit arrangement, the LTA unit still needs to lift only the first VTOL unit which, after starting operation, lifts the next HTA unit. This process is repeated until all units are operating. Of course, it also is possible to use a multiplicity of LTA units in tandem attached to a lifting line extending above the first LTA unit to increase the total LTA lift. Lifting line strength would have to be adequate to handle the increased pull.

An additional objective of the invention is to provide a convenient mean for incorporating conventional type airplane wings as lifting devices to improve forward flight efficiency. Such wings, with necessary stabilizing aerodynamic surfaces, are attached to the line above the HTA unit and are designed to carry a portion or all of the payload weight during forward flight. A single wing or multiple wings in tandem, one above the other, may be used. Fuel for the HTA unit may be carried in the wings. By using separate wings which do not tilt with the HTA unit during transition between vertical and forward flight, the HTA unit itself can be designed with a minimum of wing surface, just sufficient to provide the necessary beam structure required by the HTA unit, thereby minimizing the wing's aerodynamic problems during transition flight. Such problems are basic to tilt-wing propeller airplane designs and force small diameter prop-rotors to be used instead of preferred larger diameter ones. In addition, by locating the wings above the HTA unit they are not in the prop-rotor downwash, a situation which is detrimental when the wings remain horizontal and do not tilt. An additional benefit from wings separated from the HTA unit is their banking freedom in forward flight for improved hybrid aircraft turning performance. Generally, the mounting system of the fully tiltable HTA units on the Lifting Line restricts their ability to bank and must rely on rotating the propulsion thrust vector to turn the hybrid aircraft in conjunction with the rudders on the LTA unit and side force generators on this HTA unit.

Another objective of my invention is to reduce the drag of the cable during higher speed flight, as in cruise. To this end high strength cable, made with streamline cross-section will be used in conjunction with winches. Because of its high unit strength and low weight, the preferred cable material is made of aramid fibers, such as the material marketed under the trademark KEVLAR by E. I. Dupont de Nemours & Co. of Wilmington, Del. Although winches can be installed at the LTA unit or payload pod they preferably will be installed near the HTA unit, where power is readily available. The winches are used to reduce or increase the cable length when required. By sizing the cable cross-sectional area for the specific loads which exist, as between the LTA and HTA units and between HTA unit and payload, the total cable drag can be minimized. To prevent flutter of the streamline cable, vertcal tail surfaces will be attached at proper positions along the portion of the cable exposed during higher speed flight.

Another objective of the invention is to provide flexibility in locating the crew or payload among the units which comprise the total aircraft, these being the LTA unit, the HTA unit and the cable suspended payload pod unit. The crew can be placed in any one of these as well as in a special pod anywhere along the Lifting Line. When necessary in emergency conditions, the payload can be jettisoned allowing the aircraft to remain aloft using only buoyant lift. Location of the crew in the payload pod provides them with better vision when maneuvering the pod or payload into a desired position. When the crew is located in the upper units, a television system may be required to permit such maneuvering. Location of the crew in the LTA unit, payload pod or a special pod will give a smoother, minimal vibration, quiet ride. Payload could be carried directly in the HTA unit itself thereby eliminating the separate pod, but this would compromise the design and freedom of concept selection of the HTA unit (e.g. use of a completely tilting airplane). An additional consideration for improved safety during emergencies with crew and passengers in the payload pod, is the incorporation of a parachute into the pod. With proper pod design a high degree of safety for occupants can be attained during parachute landings, after jettison of external payload.

Another objective of this invention is to eliminate the need for a hangar or a mooring mast or any direct mooring of the LTA unit at ground level except on special occasions such as refurbishment of the LTA unit. In this hybrid aircraft little or no weight is added directly to the LTA unit beyond that necessary to attach the cable, operate controls and maintain gas bag pressure. Thus lift on the LTA unit is near the maximum possible to put tension on the upper cable at all times, resulting in the steepest cable angle attainable during high wind conditions and the highest altitude for a given cable length. Further, the cable attachment is already suitable for tethering in winds since it must be designed to tow the LTA unit through the air at an elevated location during cruise flight.

Another objective of the invention is to permit operation of the hybrid aircraft into areas which are too small to permit landing of the HTA unit or LTA unit. Since these units are located well above the payload unit on the Lifting Line, they will not hinder operations into and from relatively small clear areas.

An additional objective of this invention is to use the LTA unit as an aerial crane when maintenance and repairs need to be done on the HTA unit or the payload pod. The lifting line system permits the lowering and rotation of the HTA and payload units to make many of their areas easily accessible to ground personnel at waist to shoulder height. Maintenance, refurbishment, component and complete HTA vehicle replacement can be readily performed in the field under relatively austere conditions.

Other objectives, novel features and advantages of the hybrid aircraft made in accordance with my invention will be apparent from the description of the accompanying drawings and from the appended claims.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 1 is a somewhat schematic side elevation of the hybrid aircraft in vertical mode flight using a tip-driven helicopter type heavier-than-air unit.

FIG. 2 is a cross-sectional view of the cable assembly taken along line 2—2 of FIG. 1.

FIG. 3 is a fragmentary view of the tip-driven helicopter rotor identified in FIG. 1 without hub details.

FIG. 4 is a partial sectional view of the helicopter rotor, taken along lines 4—4 of FIG. 3.

FIG. 11 is a schematic side elevation of a tip-driven helicopter unit having blades attached to the hub by flexures in the form of cables.

FIG. 12 is a schematic plan view of one of the rotor blade assemblies of the helicopter unit in FIG. 11.

FIG. 13 is a schematic side elevation of the hybrid aircraft with multiple helicopter units mounted in tandem on the Lifting Line.

FIG. 15 is a side elevation of the VTOL airplane unit of FIG. 14 showing cable deflection and airplane unit attitude in low speed translational flight.

FIG. 16 is a rear view of the airplane unit and cable system in FIG. 15.

DESCRIPTION OF THE PREFERRED EMBODIMENT

Figure 5:
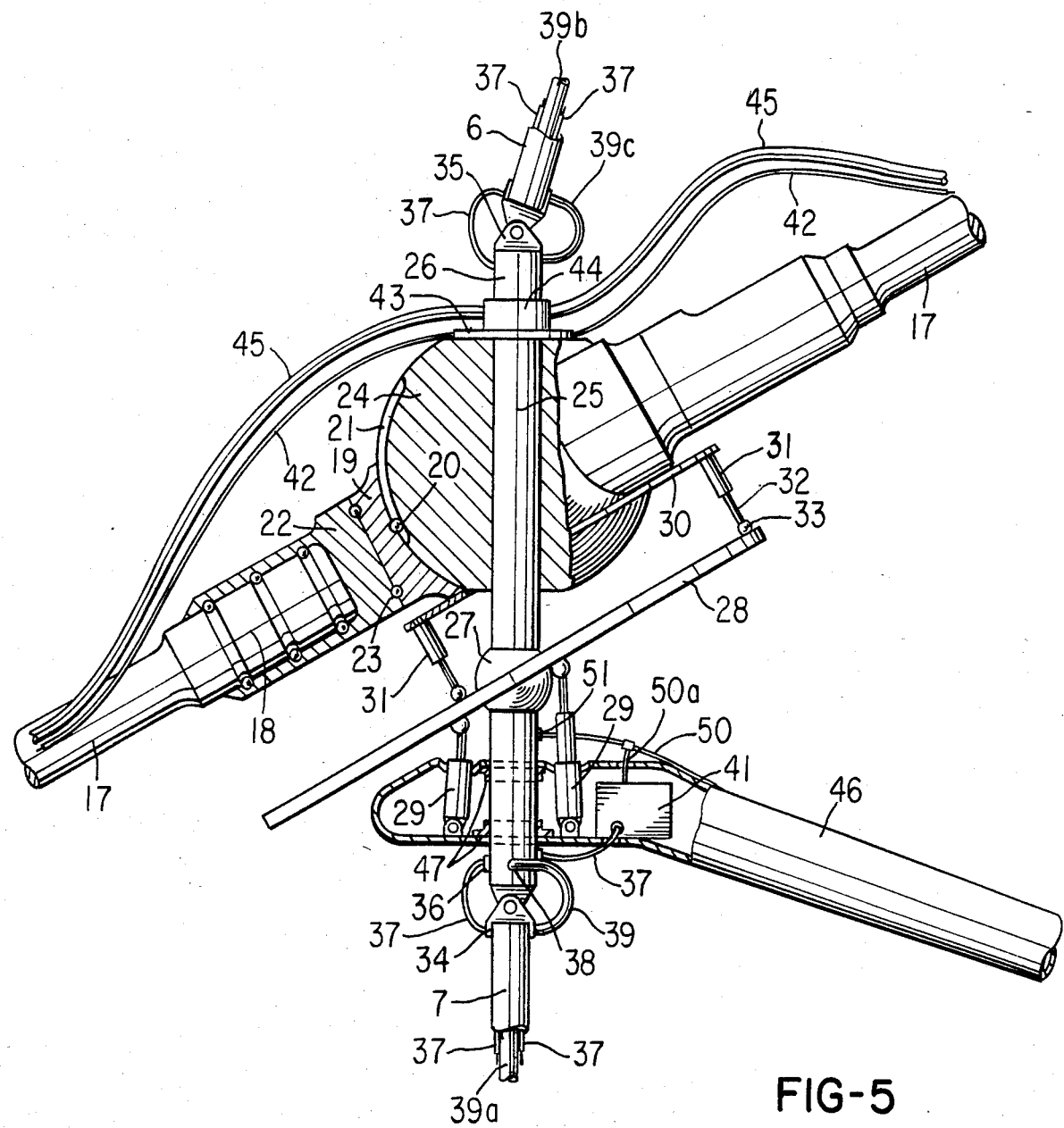
FIG. 5 is a somewhat schematic side elevation of the hub region of the tip-driven helicopter rotor of FIG. 1.

The preferred embodiment of the invention is dependent upon the operational uses intended for the hybrid aircraft as will become evident from the different forms of the invention. When operations of the aircraft are to be primarily of the short-haul, heavy-lift type, the preferred embodiment is shown in FIG. 1 and consists of three major units, a streamlined LTA unit 1, a helicopter unit 2 and a control containing structure such as payload pod 3. These are connected toether by an upper cable 6 and lower cable 7. Payload 4 is carried by payload pod 3 through cargo attachment 5. The LTA unit 1 shown is of the non-rigid (blimp) type with vertical fins 8, rudders 9, horizontal fins 10 and elevators 11. Attached to the bottom of the blimp 1 is a streamlined pod 12 which houses a small internal combustion engine power source, not shown, for operating the control system, longitudinally shifting the cable attachment 13, pressurizing the blimp's ballonet, not shown, and operating a winch, not shown, for cable 6. The pod is attached to the gas bag using conventional practices of load-distributing webbing, catenary curtains and the like. The upper cable attachment 13 is normally located below the blimp's center of buoyancy 14 with the blimp in level attitude.

The helicopter unit 2 shown in more detail in FIGS. 3, 4 and 5 is a minimal form of helicopter devoid of a fuselage and undercarriage. The helicopter unit 2 has a rotor 15 with two or more cantilever blades 17 attached through a feathering hinge 18 to a tiltable hub 16. Tilting of inner hub 19 is about ball 24. Inner hub 19 is keyed to ball 24 by a small single ball 20 inserted into a semicircular socket in inner hub 19 and rolling in a semicircular groove 21 in ball 24. Location of ball 20 is on the desired tilting axis of the hub 16. Inner hub 19 and outer hub 22 comprise a large bearing having rolling elements 23 to permit free rotation of outer hub 22 and the carrying of the axial and radial forces produced by the helicopter rotor. Ball 24 is attached rigidly on stationary tubular shaft 25 which terminates at its upper end in a swivel and cable attachment fitting 26 both of which are well known in the art. Cable attachment fitting 26 permits disconnection of cable 6 when necessary.

Tubular shaft 25 extends below ball 24 to provide a mounting for swash plate ball joint ball 27, swash plate 28 and directional control boom 46. A minimum of three electrical actuators 29, equidistantly-spaced around shaft 25 tilt and vertically translate swash plate 28 to cause changes in cyclic and collective pitch angles of rotor blades 17. To prevent any rotation of swash plate 28 around shaft 25, swash plate 28 is keyed to ball joint 27 using a spherical key and circular key way similar to 20 and 21 in the rotor hub 16. Ball 27 is slideably splined to shaft 25. The electrically-powered actuators 29 are pivotally attached at their lower ends to directional control rotor boom 46 which is firmly fixed to shaft 25 by brackets 47. Actuators 29 are pivotally attached at their upper ends to swash plate 28. Four equally-spaced position transducers 31 are fixed to plate 30 which constitutes an extension of inner hub 19 and measure distance and angular tilt of swash plate 28 from transducer mounting plate 30. The electrical signals from position transducers 31 are transmitted through electric wires, not shown, to electronic signal processor 41 which then provides control signals through electric wires 42 to electrically-powered actuators, not shown, at control surfaces 54 to control pitch angles cyclically and collectively of rotor blades 17.

Position transducers 31 have spring-loaded rods 32 which terminate in rolling balls 33. These are forcibly pressed against the smooth upper surface of swash plate 28 at all times and maintain physical contact regardless of the relative movement of swash plate 28 with respect to transducer plate 30. Shaft 25 passes through boom 46 to terminate in a fitting 34 for attaching lower cable 7. Shaft 25 also provides connection 36 for electric control signal lines 37 and connection 38 for fuel lines 39, 39a, 39b and 39c. Electrical signals from the pilot's controls, not shown, are carried by lines 37 to signal processor 41 which integrates the input from transducers 31 and commands motion of control surfaces 54 near the rotor blade tips through electric lines 42. All wires 37 from signal processor 41 pass internally through hollow shaft 25 to slip ring 43 and thence to wires 42. Wires 42 also supply the electric power produced by generators located at the engines near the rotor blade tips. Electric line 50 enters shaft 25 at 51 and connects to lines 42 through slip ring 43. Fuel for the engines in the blade tip nacelles 52 is provided by fuel tank 40 through fuel line 39 which passes through hollow shaft 25 to rotary joint 44 and thence to flexible fuel lines 45.

Refueling line 39a is sandwiched between tension members 7a shown in FIG. 2 and connects to fuel tank 40 and terminates at bottom of cable 7 in a conventional refueling connector, not shown. Fuel tank 40 is attached to cable 7 so as to permit its ready replacement when necessary. Electrically-driven fuel pumps, not shown, are located on fuel tank 40 and transfer fuel from tank 40 to fuel line 39. While fuel tank 40 is shown located below the helicopter unit, it is contemplated that the fuel tank could be located above the helicopter unit. Boom 46 extends aftwards to directional control rotor 48, driven by electric motor 49. Control rotor 48 is of the well-known controllable-pitch type used on tail-rotor-equipped helicopters. Power for electric motor 49 and blade pitch control actuators, not shown, is supplied via electric lines 50. Control signals from signal processor 41 also are carried by lines 50 connecting with line 50a.

Rotor 15 is driven by the thrust of turboprop units 53 installed in nacelles 52 located near the tip of the rotor blade 17. The turboprop units 53 are equipped with constant-speed controls common to such units. At the rear of nacelles 52 is attached a horizontal, all-moveable control surface 54, hinged at 55 and moved by electric actuators, not shown, to provide feathering moments for blade 17. The actuators are powered by electricity from engine-mounted generators. Electric wiring, not shown, within the rotor blades connects all generators together so that failure of any one generator will not cause loss of control at any control surface. Feathering of blade 17 occurs at hinge 18. Attachment of blade 17 to hinge 18 follows practice common in the art to provide feathering freedom while carrying blade centrifugal and bending loads into hub 16. Feathering stops, not shown, are incorporated into the feathering hinge 18 to limit blade positive and negative incidence angles.

Payload pod 3 is connected to lower cable 7 by a combined swivel and cable attachment 35 similar to attachment 26 used at the top of shaft 25 with cable 6. Pod 3 has a cockpit 58 for the crew, pilot controls, not shown, an electrically-powered and cotrolled directional control rotor 56, undercarriage 57 and controllable release cargo attachment 5. Control rotor 56 is similar to control rotor 48 but of different size and receives its electric power through electric lines 37.

Cables 6 and 7 are made using twin aramid webbings 7a with electric and fuel lines sandwiched between them as shown in FIG. 2. This forms a streamlined shape to reduce wind resistance. Fuel line 39a within cable 7 is round when under pressure during refueling of tank 40 and oval when not under refueling pressure. Fuel line 39b connected to pod 12 on blimp 1, being required to handle only a relatively small fuel flow, is small in diameter; it does not alter its round shape. A multiplicity of vertical fins 59 mounted on the ends of short booms are clamped to cables 6 and 7 at suitable spacings along the cables to minimize cable flutter and keep the cables oriented with respect to the air flow for minimum wind resistance.

In the preferred embodiment of the invention, the LTA unit 1 is sized to buoyantly lift the full gross weight of the complete aircraft less a specific portion of the payload weight in vertical flight, leaving that portion to the dynamic lift of the helicopter rotor 15. Thus, when the payload is removed, the buoyant lift is greater than the aircraft's weight and the rotor must reverse its thrust and pull downward to control the ascent and descent of the hybrid aircraft and keep the payload pod in contact with the ground until the aircraft is properly tethered. The amount of buoyant lift incorporated to carry payload or, conversely, the amount of rotor thrust used to lift payload is not an arbitrary decision but is based on considerations involving such factors as: required maneuverability, acquisition cost of the aircraft, operational cost, cruise speed, operating altitudes, etc.

In addition to being able to operate under complete control during vertical flight at all weights from minimum flight weight to maximum vertical take-off gross weight, the aircraft must be capable of well-controlled translational and cruising flight at these weights including an overload gross weight obtained through the use of a running take-off. Running take-offs increase dynamic lift to permit the lifting of loads exceeding those lifted during vertical take-off and are useful in such operations as extended range with extra fuel or carrying increased payload weight. In the latter case the aircraft uses a running take-off and vertical landing operation, such landing being possible because fuel has been consumed.

While a spherical balloon could be used as the LTA unit for special, low speed, short distance operations and could provide the buoyant lift at lower cost than an equivalent blimp type, the latter is preferred because it results in a more flexible hybrid aircraft capable of doing more tasks more efficiently and having better overall operating characterists under changing operating conditions such as due to winds. However, it will be understood that the use of a balloon type of LTA unit with the Lifting Line system is not proscribed when special jobs make it economically preferable.

In the preferred embodiment the LTA unit is of the streamlined, non-rigid type since this is generally lighter and less costly than the rigid type particularly in the sizes of current interest, up to approximately 1,000,000 cubic feet displacement (gross lift 62,000 lbs). Rigid types are not excluded however and the invention is not affected by the type of balloon used for the LTA unit. It is an objective of the invention to keep the amount of equipment installed in the LTA unit to the minimum required for flight and proper operation so that the steepest angle is maintained on the upper cable 6 when the aircraft is in operation or tethered to the ground. The equipment needed is expected to be an internal combustion engine power unit for pressurizing the ballonets, providing electric power for the longitudinal repositioning of the cable attachment 13, for moving the control surfaces 9 and 11 and, possibly, for operating a low-powered winch to change cable 6 length.

To position the payload pod 3 and payload 4 during hover, vertical and low speed flight, the helicopter unit 2 is moved about horizontally and vertically with the LTA unit 1 slowly following but placing little restraint on the helicopter units' motion. Thus, much more rapid maneuvering of pod 3 and payload 4 is possible than for hybrid systems which have the LTA unit rigidly coupled to the helicopter unit. To improve the vertical maneuvering speed of the payload pod, use is made of the kinetic energy of the high-inertia rotor 15 with its tip-mounted turboprop units 53 to provide large changes in vertical force, positive and negative, on the upper cable 6, accomplished by rapid blade collective pitch changes. These force changes may be coupled with the use of an automatic load-limiting and rewind winch in the upper cable system, to reduce the time for vertical movement of payload pod and payload over that required when a fixed-length cable is used. A fixed-length cable makes it necessary to accelerate the LTA unit 1 along with the payload pod 3 and payload 4, slowing the vertical maneuvering.

The pilot and other crew members are located in the payload pod 3 so as to be close to paylod 4 and the ground when the aircraft is anchored to the ground. The payload 4 is carried externally by an extension of cable 7 passing through the payload pod 3 which is of light weight construction and attached to cable 7. The pod 3 has an undercarriage 57 and means for attaching itself rigidly to the payload. Directional control of the pod 3 and paylod 4 is obtained through use of a directional control (tail) rotor 56 powered either by an electric motor with current coming from the turboprop units 53 or by an internal combustion engine within the payload pod. The pilot's rudder pedals are linked to the tail rotor 56 on the pod 3 and a sensor system, not shown, located on the payload pod 3 provides signals to the helicopter unit's directional control system to directionally align the helicopter unit 2 with the payload pod 3. In forward flight, when the aircraft is turning, the pod 3 and payload 4 swing naturally with the cable 7, banking automatically to eliminate all side force on occupants, pod 3 and payload 4. A horizontal stabilizer 56a is added to the pod 3 to provide longitudinal stability during forward flight. It should be understood that pod 3 need not be an enclosed structure, but could be an open platform. In lieu of securing the payload externally, the payload could be carried within the pod.

The pilot's longitudinal, lateral, collective pitch and throttle controls are connected electrically to helicopter unit 2 and remotely control the movement of swash plate 28, blade collective and cyclic pitch angles and engine power setting. The pilot's commands pass into the electronic signal processor 41 which combines them with stabilization and autopilot inputs to provide correct control signals to the rotor controls.

The preferred means of control for the tip-driven rotor 15 is through control surfaces 54 near the blade tips shown in FIG. 3. Control surfaces 54 use aerodynamic forces to feather the blades 17. With such a system, there is virtually no reaction on swash plate 28 or shaft 25 of the helicopter unit 2 when control forces are being applied to move swash plate 28. The more common method of blade pitch control, used by nearly all of today's helicopters, is to apply forces to arms near the blade root. These forces are substantial and must be reacted through the swash plate by the airframe. With the low airframe inertia available to helicopter unit 2 to react these forces and their resultant moments on the airframe, it is necessary to use the line tension acting on the top and bottom of shaft 25 to provide the reaction necessary to directly control the angles of rotor blades 17. When the lower line 7 is lightly loaded, e.g. no payload, the shaft's ability to react the swash plate 28 loads is seriously reduced.

It will be understood that while a swash plate 28 moved by electro-mechanical actuators is shown in FIG. 5, it is, of course, possible to eliminate the mechanical system and the tilting swash plate and replace them with a more sophisticated system based on solid-state electronics and sensors. These would relate the rotor plane (tip-path-plane) attitude to a gyroscopically established reference plane. The rotor attitude would be still controlled through cyclic action of the control surfaces 54 near the blade tips. Rotor thrust would be controlled by collective movement of the control surfaces 54 using a thrust sensor to determine the amount of movement.

Figure 6:
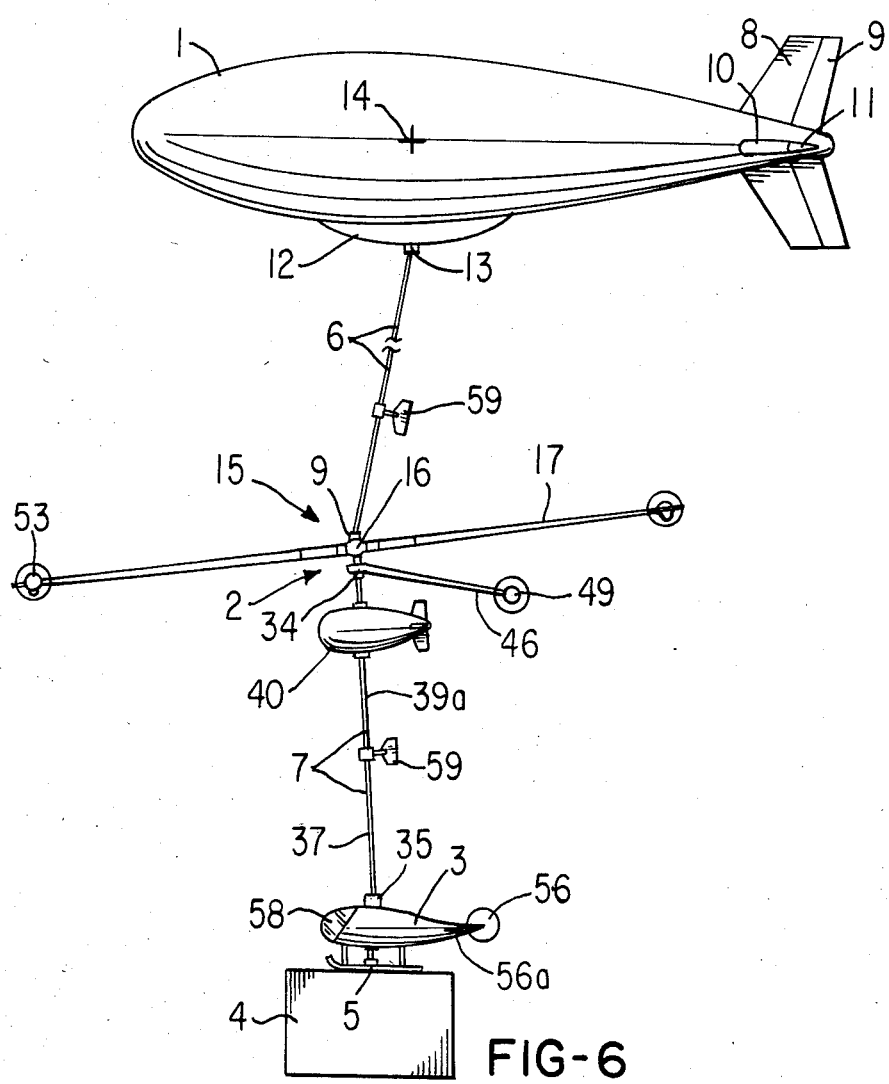
FIG. 6 is a view similar to FIG. 1 showing the hybrid aircraft in forward flight carrying payload.
Figure 7:
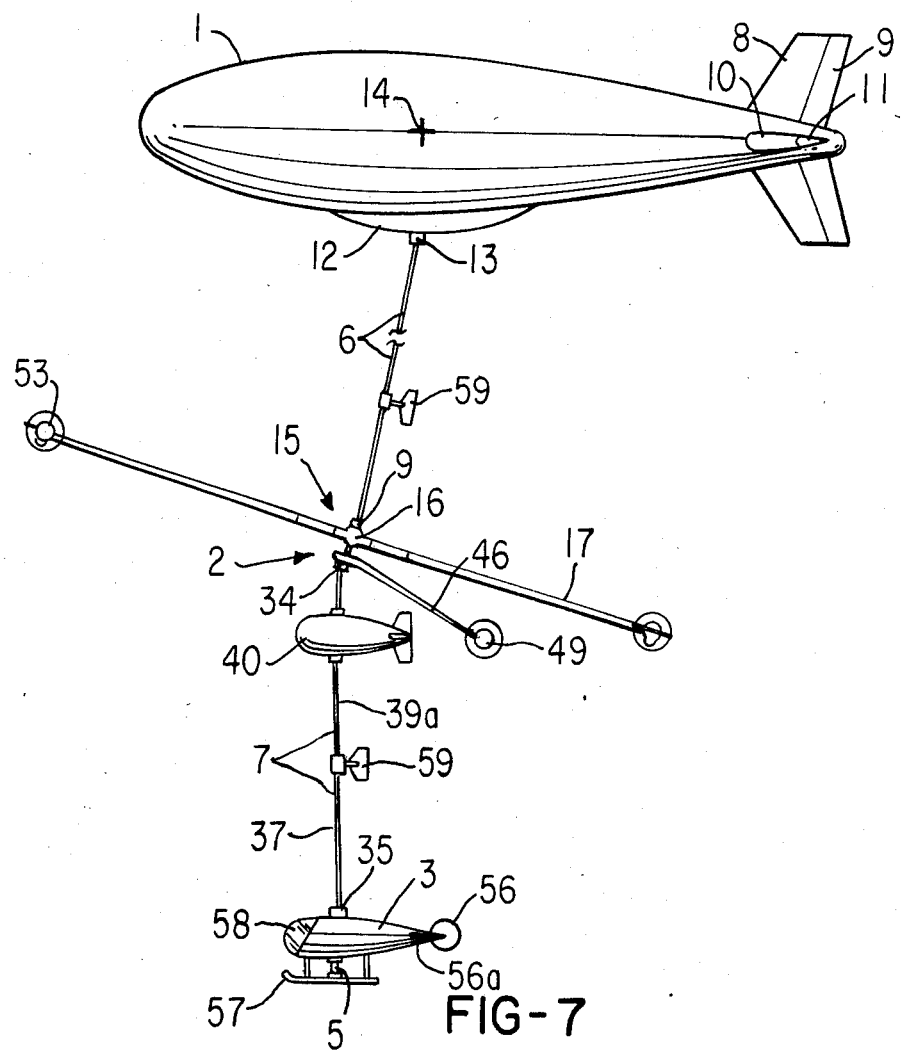
FIG. 7 is a view similar to FIGS. 1 and 6, showing the hybrid aircraft in forward flight without payload.

The rotor 15 has two modes of operation. When the buoyant lift is less than the aircraft weight, the rotor operates in the conventional helicopter mode providing positive thrust and tilting the tip-path-plane in the direction of desired motion as shown in FIG. 6. Complete control of the flight path is obtained in the same manner as in a helicopter by adjusting rotor thrust (blade collective pitch and throttle) and tip-path-plane tilt (cyclic pitch). But when the buoyant lift is greater than the aircraft weight, as when the payload is removed, the rotor exerting negative thrust must tilt its tip-path-plane away from the direction of motion, opposite to normal helicopter tilt, to obtain the necessary horizontal force component for translational flight as shown in FIG. 7. The amount of rearward tilt of the tip-path-plane is a function of the negative lift required, the airspeed and drag of airship unit 1, cables 6 and 7 and appendages such as the payload pod 3, fuel tank 40 etc. When operating in the negative thrust condition rotor-tip-path-plane tilting must be reversed in response to pilot control motion from that normally obtained under positive thrust conditions. In normal operation the rotor and control stick tilt in the direction of desired motion (e.g. forward for forward flight, left for left turning flight, etc.) but when the thrust is negative, the tip-path-plane must tilt aft for forward flight and to the right for left turns while the pilot's controls still retain their normal relationship to flight direction. Thus a control reversal must occur when the rotor thrust goes from positive to negative. An electronic control system, such as that selected for the preferred embodiment of the invention, readily permits such control system reversal. This is done essentially by reversing the response of swash plate 28 to the pilot's cyclic control stick movement, such reversal may be automatic or activated by the pilot. The other controls—directional, collective pitch and throttle do not reverse or change when rotor thrust direction changes.

It should be noted that, once forward flight speed is attained, the excess buoyant lift can be added to or decreased by changing the LTA unit's angle of attack or by adding wing lift through airplane 128 (FIG. 14) attached to cables 6 or 7 to provide supplementary dynamic force. This will affect the rotor thrust required and the rotor tilt angle, possibly leading to improved forward flight efficiency. Change of the LTA unit 1's angle of attack can be done by either longitudinally moving the cable attachment point 13 (trimming), moving the elevator 11 or using a combination of both methods. If retrimming of the cable attachment point 13 is adequate to handle angle of attack changes needed, the elevators 11 may be eliminated in favor of a fixed horizontal tail stabilizing surface, thereby reducing its complexity and weight.

Rudders 9 improve the turning maneuverability of the hybrid aircraft in forward flight. While the LTA unit 1 can be turned solely by imparting a lateral angle to cable 6 by having the helicopter unit 2 change its flight direction, coupling of the cable 6's lateral force with use of the LTA unit's rudders 9 reduces the time needed to make a turn in forward flight. Further, pull from cable 6 is applied below the center of buoyancy 14 causing the lateral forces to roll (bank) the LTA unit 1. Although tolerable, this is undesirable since the rudder 9 forces then produce pitching moments on LTA unit 1 in addition to the yawing moments. By using the rudders 9 to yaw the LTA unit 1 and keep the cable force essentially in the vertical plane of the LTA unit (coplanar with the plane defined by center of buoyancy 14 and cable attachment 13) cable induced rolling moments can be minimized. Maximum benefit from the use of the rudders 9 is obtained by connecting them to the pilot's controls so that they operate in conjunction with the turning controls on the helicopter unit. It should be noted that LTA unit 1 seeks always to align itself with the relative airflow and, unless yawed by the rudders 9, may not be aligned with the helicopter unit's longitudinal axis. In straight flight, it is desirable to permit the LTA unit 1 to align itself with the relative airflow to reduce drag.

Figure 8:
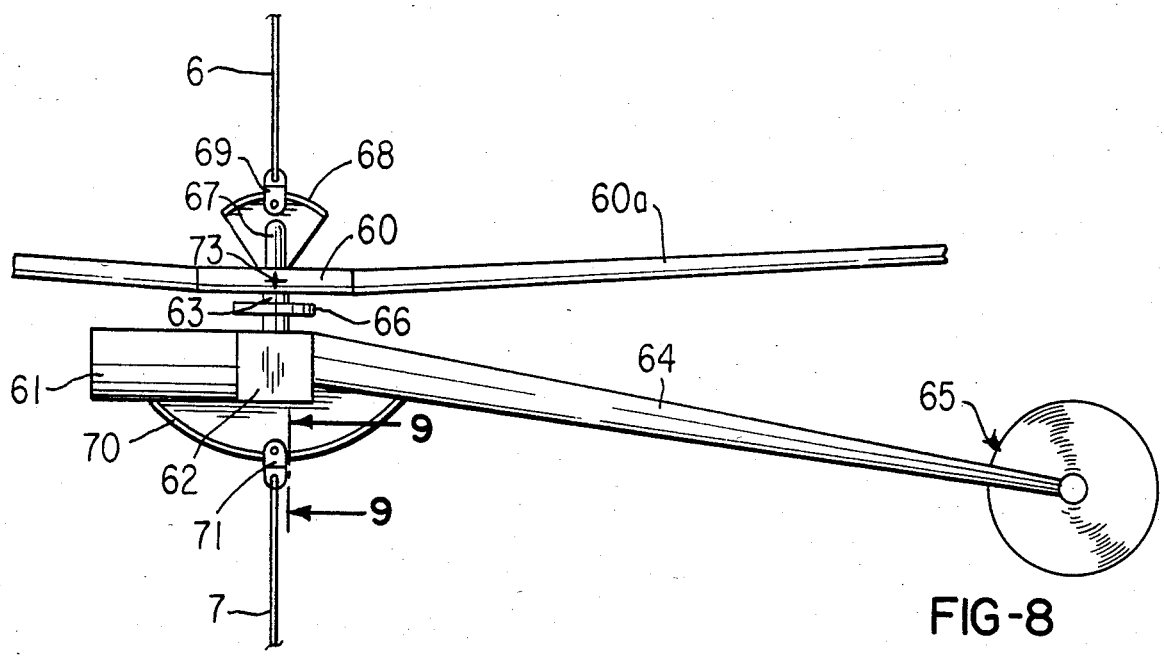
FIG. 8 is a side elevation of a mechanically-driven helicopter unit for use in the hybrid aircraft assembly.
Figure 9:
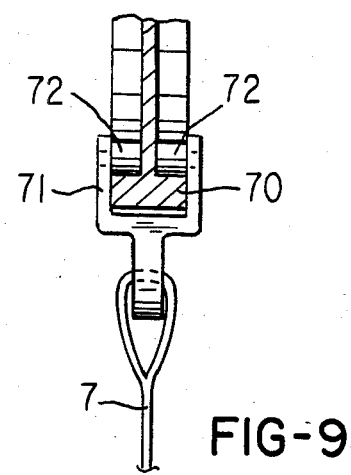
FIG. 9 is a cross sectional view of the curved track and roller system designed to place the helicopter unit's tilting axis at a selected vertical location in the helicopter unit, taken along line 9—9 of FIG. 8.

While the foregoing description of the preferred embodiment of the hybrid aircraft provides specific ways and devices for making the aircraft, it will be appreciated that these can be varied and changed without altering the invention. For example, the hub arrangement of FIG. 5 which obtains its tilting through a ball joint consisting of ball 24 and inner hub 19 can be replaced with a Cardan-type joint well known in the art. The tip-driven helicopter rotor 15 can be replaced by a conventional geared-transmission-driven rotor (FIGS. 8 and 9) driven by an engine 61 located next to transmission 62 and having an anti-torque rotor 65 mounted on boom 64. In this arrangement, where the upper cable attachment 69 above rotor hub 60 is spaced substantially away from the lower cable attachment 71 below the gear drive box 62, the cables are attached to carriages 69 and 71 which move on curved tracks 68 and 70 respectively, the radii of curvature being selected to cause the effective intersection point of cables 6 and 7 force vectors to be approximately coincident at a selected point, such as 73, thereby reducing the restraining moment due to cable tension and allowing the helicopter unit to bodily tilt through large longitudinal angles. Track 68 is mounted on a freely revolving shaft 67 which permits track 68 to be azimuthally oriented in the direction of cable pull to eliminate lateral moments due to cable tension. Obviously, such a carriage-track system can be used with tip-driven rotor 15 of FIG. 4 if it is desired to reduce further cable-induced moments on shaft 25. The rotor hub 60 is mounted on drive shaft 63, controlled by swash plate 66. Rotor blade 60a is attached to hub 60 by feathering bearings common to existing helicopters.

Figure 10:
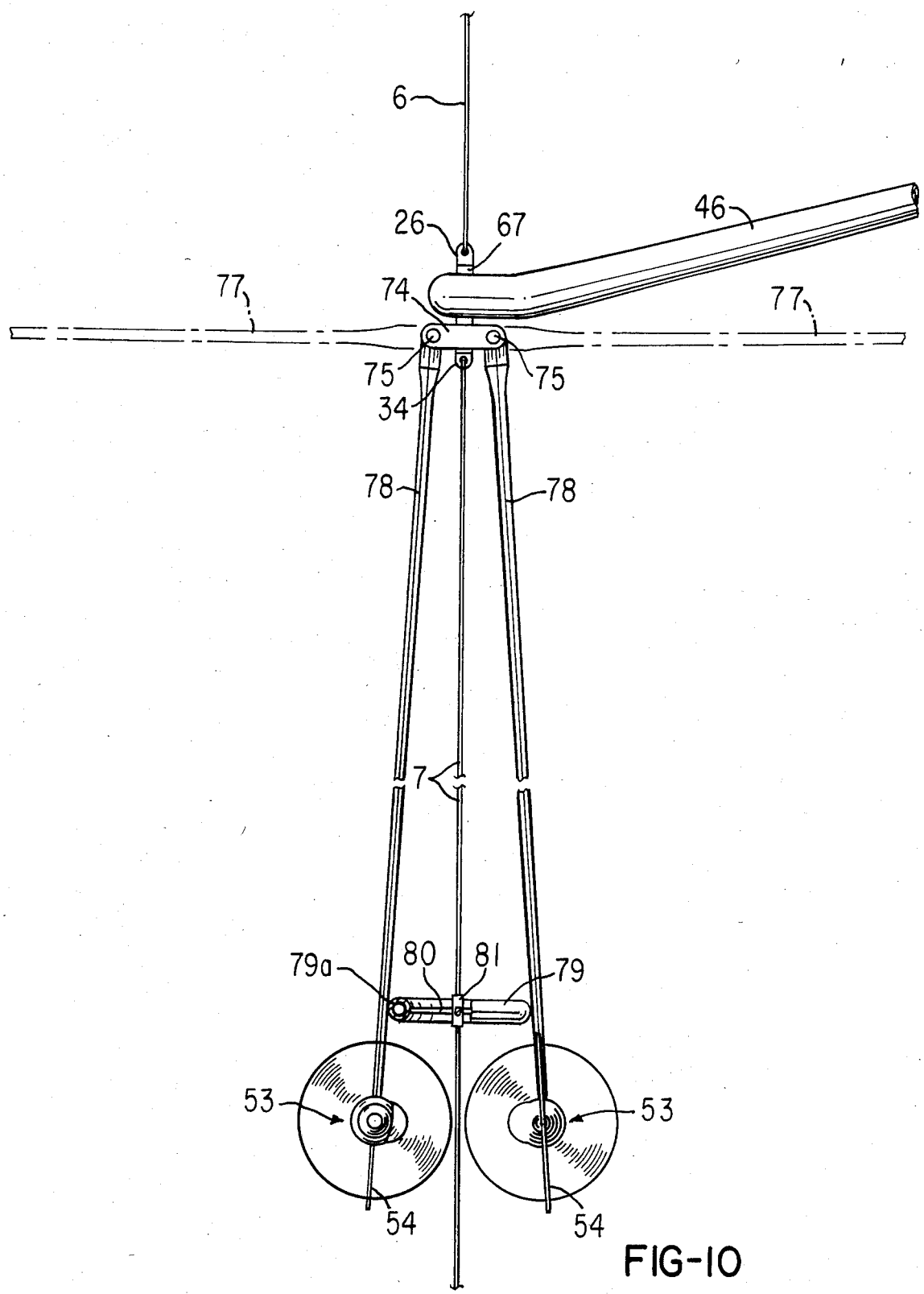
FIG. 10 is a schematic side elevation of a tip-driven helicopter unit with hinged rotor blades showing the helicopter unit mounted on the Lifting Line.

While the preferred rotor system is of the hingeless, cantilever type shown in FIG. 5, the individually-hinged or articulated blade type such as commonly employed on Sikorsky and Boeing-Vertol helicopters also can be used with this invention as shown in FIG. 10. The Lifting Line concept is beneficial to the articulated rotor system since it permits the elimination of droop stops which are necessary on conventional helicopters. With the Lifting Line 6 the rotor tips in stopped, hanging position can be kept well above any obstructions. Individually hinged blades have the merit of being lighter than hingeless blades with their weight being reduced even further by the elimination of droop stops. The blades 78 do require a more complex blade root and hub attachment arrangement than the cantilevered type but such blades eliminate the need to use a floating hub 16 as shown in FIGS. 3 and 4. Blade articulation may be obtained by conventional hinge systems of pins and bearings 75 or by flexures such as elastomeric bearings. With hinged blades, the airframe, transmission and directional control elements must be mounted so as not to physically interfere with the rotor operation. FIG. 10 shows one such arrangement where the rotor blades 78 are attached to hub 74 through hinges 75 which allow the blades 78 to move up and down in response to air loads. When the rotor slows its rotation, the blades 78 slowly swing down around hinges 75 from position 77 until, with rotation completely stopped, the blades rest against blade rest 79 shown in fragmented section in FIG. 10. Blade rest 79 has a ring 79a which is attached to cable 7 by sleeve 81 and spokes 80 and is used to space the tip propulsion system 53 away from cable 7 and from each other. The helicopter unit elements shown under the helicopter rotor hub in FIG. 5 such as swash plate 28, directional control boom 46, actuators 29, etc. are inverted and mounted above rotor and hub 74, partially shown in FIG. 10 to permit the rotor blades 78 to swing down without any interference. Cables 6 and 7 may be attached to a carriage and track system similar to 68, 69, 70, 71 and 72 in FIG. 8 so that their tension force acts through a selected point in hub 74. Hub 74 rotates freely around stationary shaft 67 on bearings, not shown, and tilting of the rotor tip-path-plane is obtained through flapping motion of blades 78 around hinges 75. Drag hinges, not shown, may be incorporated into blades 78 to relieve chordwise stresses due to fluctuating aerodynamic forces and Coriolis effects.

FIGS. 11 and 12 show a helicopter rotor with a cable type of flexure arranged to provide blade flapping freedom and to permit blade angle change without the use of feathering bearings. Rotor hub 84 rotates around shaft 67. Attached to hub 84 are outer cables 87 which are fixed to the edges of flexible covering 89, preferably airfoil shaped in cross section. The airfoil shape is obtained by a light weight filling material, not shown, located between the upper and lower portions of cover 89. In planform, the covering is of catenary shape to cause cables 87 to produce a chordwise tension on the covering 89 to stiffen it against airloads and help prevent flutter. Cables 87 are attached to hub 84 at 84a and 84b. 84a and 84b are vertically offset to provide a positive incidence angle to the root end airfoil and improve rotor lifting efficiency. Attached to cables 87 is a rigid blade 82 having propulsion unit 86 and blade pitch angle control surface 90 near its tip. Internal cables 88 also are attached to hub 84 and to blades 82 and are used to stiffen the rotor blade in the chordwise direction. When blades 82 hang down, the cables 87 and 88 and covering 89 bend over a suitably curved rest 85 whose curvature is designed to prevent creation of excessive bending stresses in cables 87 and 88. FIG. 11 illustrates the blades in non-rotataing position in solid lines and rotating position in broken lines.

Because of the operational flexibility of the Lifting Line system, it is possible to readily increase the lifting capability of the aircraft by adding additional helicopter units and cable lengths in tandem below the original helicopter unit 2 of FIG. 1. Such an arrangement is shown in FIG. 13. The additional helicopter units can be identical with original helicopter unit 2 or of different size and lifting capability, depending upon the availability of such units and the lifting capacity desired from the complete hybrid aircraft. As helicopter units are added, additional segments of cable 91 are added also, each of these segments being of greater strength than the one above. This is required to handle the increasing tension imposed by each successive helicopter unit. Shaft 25 and cable attachment fittings 26 and 34 of FIG. 5 would have to be replaced to take the higher loads or built to take the highest anticipated load expected in such multiple rotor operations.

Control of each helicopter unit would be identical with that of the original unit and all would execute identical maneuvers in response to the pilot's commands. Vertical spacing between the helicopter units would be such as to substantially reduce downwash interference among the rotors. Such interference reduces the lifting capability of each rotor below the uppermost. When hovering in a wind the downwash is skewed and, with suitable spacing between helicopter units, the interference effects are eliminated. Another technique for eliminating downwash interference is to tilt the rotor tip-path-planes in opposite directions thereby skewing the downwashes. The horizontal forces from each rotor are opposed by the rotor below and the net horizontal force on the hybrid aircraft is zero during hover.

With multiple helicopter units, the effect of stopping any one rotor, as during an emergency, will permit the loaded aircraft to continue operating and execute a fully controlled landing without damage to the aircraft's components. Furthermore, by releasing the payload just prior to ground contact and, by increasing collective pitch rapidly on the remaining operating rotors, the payload pod and occupants can be spared any landing shock due to an emergency vertical descent.

The technique for assembling the multiple helicopter unit Lifting Line system is essentially an extension of the normal procedure used with a single helicopter unit. First, the LTA unit lifts and sustains the non-operating helicopter unit and the cable hanging from that unit is attached to the next helicopter unit, still on the ground. After the first helicopter unit is in operation, the helicopter unit on the ground is lifted. This sequence is repeated until all of the helicopter units are airborne and operating at which point the payload pod and payload are lifted. When no payload is being lifted the helicopter units may be placed on the ground in sequence, side-by-side, or continue in the airborne mode during which engines may be stopped on some rotors to conserve fuel while the remaining rotors sustain the aircraft. The elements identified in FIG. 13 correspond to those shown in FIG. 1.

MODIFICATION

Figure 14:
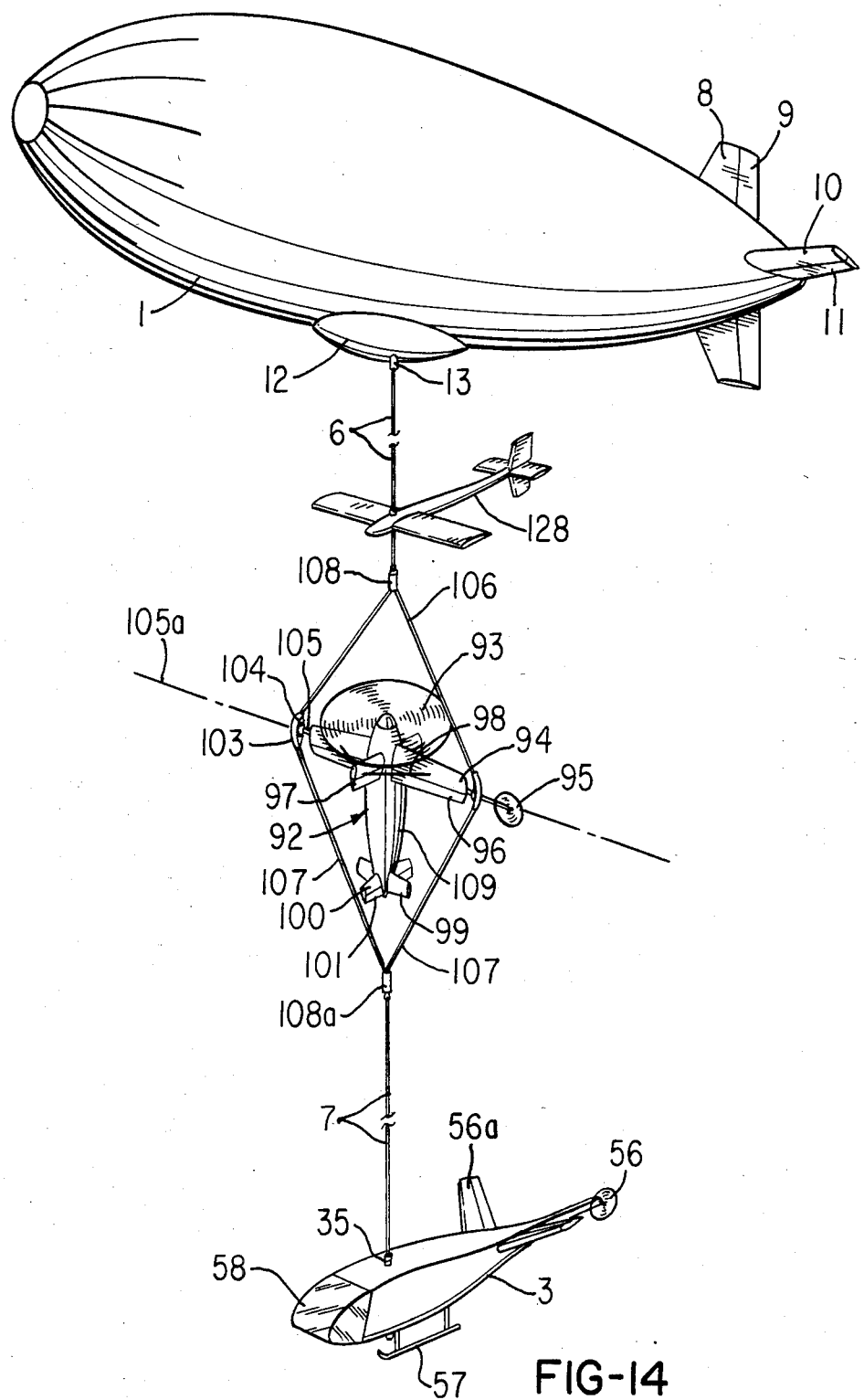
FIG. 14 is a pictorial view of the hybrid aircraft with a single prop-rotor tilting VTOL airplane unit mounted on the Lifting Line.
Figure 17:
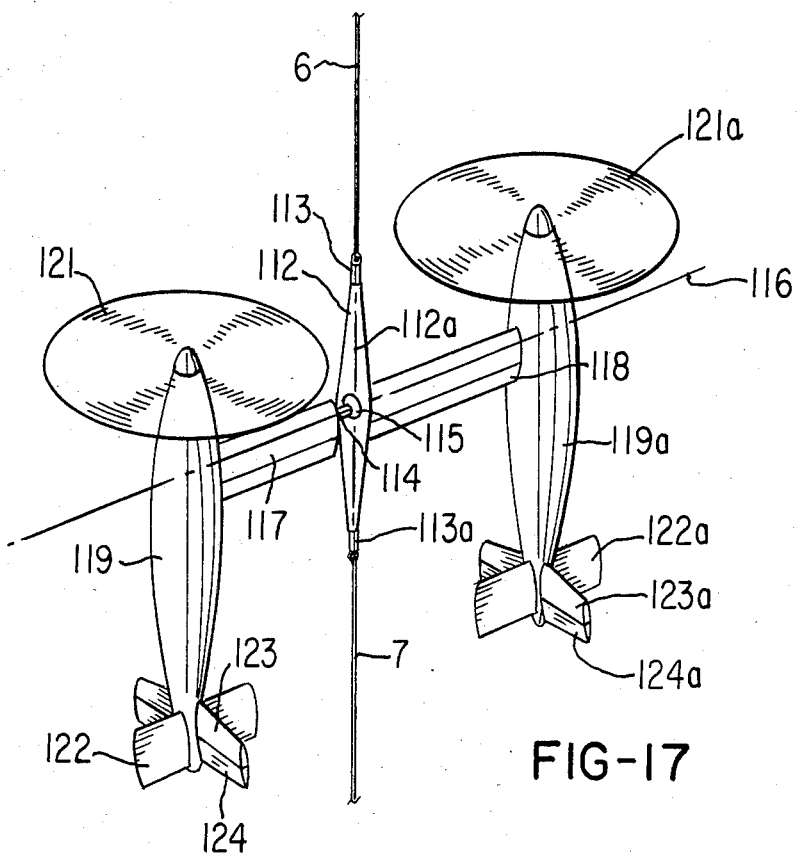
FIG. 17 is a pictorial view of a twin-rotor tilting VTOL airplane unit mounted on the Lifting Line showing the airplane unit in vertical mode flight.

It will be understood that the invention can use not only helicopter-type units as part of the hybrid aircraft but any other form of VTOL heavier-than-air aircraft. FIG. 14 illustrates the hybrid aircraft with a single-rotor type VTOL airplane unit 92 installed in the Lifting Line and FIG. 17 illustrates a twin-rotor type VTOL airplane unit so installed. It already has been noted that an important consideration in the use of a helicopter type unit, FIG. 1, is the limited tilting possible of the rotor tip-path-plane when the Lifting Line effectively passes through hub 16, making it impractical to operate the hybrid aircraft under neutral buoyancy conditions because the rotor cannot provide horizontal propelling forces without producing vertical forces, making it impossible to hold constant altitude while translating at low speeds without dumping ballast or valving lifting gas. (At higher speeds, dynamic lift can be imposed on the LTA unit or generated by auxiliary wing surfaces attached to the Lifting Line to counter the vertical force component of rotor thrust.) A practical hybrid aircraft with a helicopter-type unit must have positive buoyancy without payload and use negative thrust and aftward tilting of the helicopter rotor for controlling altitude while providing forward propulsion. Use of fully tiltable VTOL airplane units permits the generation of forward propulsive force with any desired amount of vertical component of rotor thrust, from zero to nearly the entire thrust available from the rotor directed either upward or downward.

In FIG. 14 all of the elements are similar to those shown and identified in FIG. 1 except for the bifurcated cables 106 and 107, and VTOL airplane unit 92. The cable 6 from LTA unit 1 terminates at swivel 108 from which upper bifurcated cables 106 connect to the upper end of trunnion plates 103 at the wing tips of VTOL airplane unit 92. Lower bifurcated cables 107 extend from the lower end of trunnion plates 103 to lower swivel 108a to which is connected lower cable 7 which passes through payload pod 3 to payload as in FIG. 1. VTOL airplane unit 92 has a fuselage 109 which contains an engine and gear drive system, not shown, to drive main rotor 93 and anti-torque rotor 95 mounted on a boom extending from tip of wing 94. Main rotor 93 is mounted at the nose of fuselage 109 and may have collective and cyclic blade pitch controls, not shown. Vertical tail surfaces 100 having rudders 101 and all-moving horizontal tail surfaces 99 are attached to the rear of fuselage 109. A wing-like side-force-generating surface 97 is mounted on the fuselage 109 in the proximity of trunnion axis 105a and also serves as a mast for brace wires 98 connected to wing 94. Wing 94 acts as a spreader bar for cables 106 and 107 and incorporates ailerons 96. The VTOL airplane control system is of the electrical fly-by-wire type with the various components—electronic signal processor, stabilation system, and control surface actuators, all well-known in the art and not shown, installed within the fuselage 109. Electric power for operating the control system is provided by an electric generator, not shown, attached to the engine. The anti-torque rotor 95 is of the type usually found on tail-rotor type helicopters and has blade collective pitch change capability for thrust control. Fuselage 109 contains a fuel tank, not shown. The fuel tank is filled through cable 7 as shown in FIG. 2 with the fuel passing around swivel 108a, through a rotary joint, not shown, in one of the trunnion plates 103 and thence through conduits, not shown, in wing 94. Fuel for the power plant in the LTA unit 1 is pumped around trunnion plate 103 thence through bifurcated cable 106, around swivel 108 and through cable 6. Electric wiring for power and control is located in the other leg of the bifurcated cables 106 and 107 with slip rings or flexible wires, not shown, being used to permit electric current to be carried across the trunnion plate 103 to the VTOL airplane 92 with flexible electric wires providing connection at swivels 108 and 108a. As in FIG. 5, cables 6 and 7 contain electric wiring 37, FIG. 5, connecting with that in the bifurcated cables.

Within selected limits from beyond straight up to beyond straight down the VTOL airplane unit is free to tilt around trunnion axis 105a on shaft 105 pivotally mounted in trunnion plate bearing 104 as described in further detail below. FIGS. 15 and 16 show the VTOL airplane unit suspended between bifurcated cables 106 and 107 and the tilting freedom about trunnion axis 105a. Rotation of the VTOL airplane unit takes place about the nearly vertical axis 111 connecting swivels 108 and 108a. Swivel 108 connects cable 6 to bifurcated cable 106 and swivel 108a attaches cable 7 to bifurcated cable 107.

In FIG. 17 the single-rotor VTOL airplane unit of FIG. 14 is replaced by a VTOL airplane with twin, laterally-disposed counterrotating-rotors. Cable 6 attaches to the upper end of trunnion strut 112 through swivel 113. Trunnion strut 112 contains, at its center, bearing 115 through which tubular spar 114 passes permitting the VTOL airplane unit to tilt freely through selected limits. Cable 7 attaches to the lower end of trunnion strut 112 through swivel 113a. Attached to tubular wing spar 114 are wing panels 117 which, with tubular spar 114 connects the left and right fuselages 119 and 119a together. These fuselages are essentially identical. Mounted, at the nose of each fuselage are rotors 121 and 121a which rotate in opposite directions to counteract torque. Ailerons 118 are incorporated into wing 117 and horizontal all-moving tail surfaces 122 and 122a, vertical fins 123 and 123a, and rudders 124 and 124a are attached at the rear of fuselages 119 and 119a respectively. As in the single-rotor VTOL airplane unit, FIG. 14, each fuselage contains an engine with electric generator, power transmission gearing, control system elements and fuel tank. A cross-shaft, not shown, passes through tubular spar 114 and connects the power transmissions of each engine together so that either engine can drive both rotors. The inoperative engine is automatically disengaged from the drive system through an over-running clutch, not shown, located between the engine and transmission unit. Fuel and electric current are transmitted through cables 7 and 6, through strut 112 to the VTOL airplane unit and LTA unit 1, FIG. 1, in a way similar to that used with the single-rotor VTOL airplane unit of FIG. 14, except that the fuel lines and electric cables do not take separate paths in the case of the twin-rotor airplane unit.

In the embodiment of the invention which uses tilting VTOL airplane units, FIGS. 14 and 17, there is more freedom to select the amount of excess buoyancy for flight without payload than in the case of the embodiment with the helicopter-type unit, FIG. 1. In the embodiment with the VTOL airplane, the sizing of the LTA unit and the amount of thrust from the rotors of the VTOL airplane will be determined by such considerations as maneuverability needed, system acquisition cost, operating cost and, possibly, by the thrust capability of already existing helicopter rotor-engine-transmission systems which can be adapted for use on the VTOL airplane unit. Although the rotor functions as both a lifting rotor and as a propeller it is possible to use existing helicopter rotors for this purpose. By designing the hybrid aircraft around existing elements substantial development and manufacturing cost savings can be realized, even if some modifications have to be made to the components to adapt them to prop-rotor type operations.

While a tip-driven rotor (FIG. 3) can be used on the VTOL airplane unit of FIG. 14, such rotors generally are aimed at large diameter, low disc loading, very heavy lift systems. Their use on a VTOL airplane unit dictates a relatively large wing span with attendant structural difficulties and weight penalties. Therefore, the preferred embodiment of the VTOL airplane unit has gear driven rotors. The VTOL airplane unit can be of the single main rotor, or twin-lateral rotor type, the choice being dependent in part on the payload weight to be lifted and also on the availability of already developed helicopter components, if the VTOL unit is to be based upon such existing elements. Many of the operational considerations for both types are the same, hence portions of the discussion of the single main rotor unit also apply to the twin-lateral rotor type. Further, it should be noted that a twin-rotor coaxial counter-rotating system can be used in place of the single main rotor type, but is not a preferred choice because of its higher cost and because such rotor systems are not available in the western world.

The VTOL airplane unit of FIG. 14 uses a helicopter rotor to provide both vertical thrust, up or down as required, and as the propeller in higher speed forward flight. The rotor is therefore, a "prop-rotor" and, as such, should have a blade twist which gives good efficiencies in both hovering and forward flight. This rotor is driven by a geared power transmission system driven by a split shaft, free turbine engine which permits the prop-rotor to operate at various rotational speeds without reduction in available power or inefficient engine operation. During vertical and low speed flight high prop-rotor rotational speed is used to provide high thrust for lifting payload and for maneuvering. Because of the lower thrust required during cruise flight in propeller operating mode, it is necessary to reduce prop-rotor rotational speed to obtain good propulsive efficiency.

While the VTOL airplane could be free to operate with its longitudinal axis at any angle from vertical through horizontal, over a 360 degree range, for practical reasons the tilting is limited to about 200 degrees, allowing the thrust force to be directed in any direction from near-vertical upward through near-vertical downward. This, combined with rotation about the vertical axis, permits the thrust force, when tilted, to exert horizontal force on the VTOL airplane unit in any direction from forward to sideways to aftwards with respect to the LTA unit, thereby providing maneuvering capability.

In forward flight the VTOL airplane unit's longitudinal axis is inclined from the vertical in the direction of flight, the inclination being such that the prop-rotor provides both lift, either positive or negative, as required and propulsive force for the hybrid aircraft. The inclination increases with forward speed until the longitudinal axis is near horizontal at which point the VTOL airplane unit's wing plus the auxiliary wing, if used, and the aerodynamic lift on the LTA unit provide the vertical force needed to balance the difference between the hybrid aircraft's flight weight and its buoyant lift. When the buoyant lift is greater than the flight weight the dynamic lift must be negative and the VTOL airplane unit, auxiliary wing and LTA unit all operate at negative angles. When the buoyant lift is less than the flight weight, these items operate at positive angles. The division of lift among these units is arranged to produce the lowest drag and best forward flight efficiency.

Between vertical mode flight and low forward speed flight, the VTOL unit operates at tilt angles which are beyond the stall angle of its wing, unless a freely feathering wing surface or a fixed wing-tilting fuselage system is used. Stalling of the wing produces loss of wing lift, increased drag and buffetting vibration. These effects are minimized by confining high angle of attack operations of the VTOL unit to low speed flight where the dynamic pressures and aerodynamic forces are low. During transition to higher speed flight the VTOL airplane is tilted to obtain wing angles below stall with the necessary increment of lift being obtained from the aerodynamic forces on the LTA unit and on auxiliary wing 128 (FIG. 14). This wing 128 is located between the LTA unit and the HTA unit. It is essentially an unpowered airplane, like a glider, with wing stabilizing aerodynamic surfaces all of lightweight construction. Wing 128 is attached to cable 6 is a manner similar to other attachments herein described. The VTOL airplane unit's wing has the minimum chord and depth required to provide an adequate structure for the compression loads from the bifurcated cables and bending loads due to prop-rotor thrust and VTOL airplane unit's weight. The wing chord length also is determined by the need to minimize the wing drag when operating at higher forward speeds and low angles of attack and, also, to incorporate ailerons. The wing span is sufficient to permit tilting of the airplane unit with adequate clearance between prop-rotor blade tips and bifurcated cables (see FIGS. 15 and 16).

Because it is shaft driven, the single prop-rotor VTOL airplane unit requires an anti-torque system such as a rotor 95, FIG. 14, mounted off one wing tip, having its plane of rotation essentially parallel to the wing chord and thrust perpendicular to it. In hover, the anti-torque rotor thrust, the ailerons 96 and the side force generator 97 counteract the prop-rotor torque and provide roll control. Roll control is used to change the direction of the horizontal component of the prop-rotor thrust when it is inclined from the vertical, as shown in FIG. 15. The thrust vector is rotated azimuthally about axis 111. The anti-torque rotor 95 is automatically decoupled from the drive system and stopped when the VTOL airplane unit 92 has tilted to the angle where the wings 94 are unstalled.

Tilting of the VTOL airplane unit takes place about a shaft 105 and bearing 104 system located at each wing tip, the axis of tilt 105a passes through the wing near the mean aerodynamic center and approximately through the airplane unit's center of gravity. The shaft 105 projecting from each wing tip fits into a bearing arrangement in the trunnion plate and is designed to permit rotation about the spanwise axis and to handle radial, axial and trunnion plate bending loads much like an automobile wheel. The trunnion plates 103 carry the bifurcated cable tension loads around the VTOL airplane unit's wing tips to the upper and lower cables 6 and 7.

Tilting of the VTOL airplane unit is produced by application of longitudinal cyclic control to prop-rotor 93 and by rotation of the all-moving horizontal tail 99. During vertical flight the prop-rotor's slipstream provides force on horizontal tail 99 to help tilt the airplane unit. In translational flight the horizontal tail angle is adjusted to hold a selected flight attitude of the VTOL airplane unit. Either articulated blade or hingeless rotor systems may be used. Hingeless rotors have the merit of being able to produce larger hub moments than articulated types, a characteristic useful in producing moments on the airplane unit longitudinally and about its yaw axis. Helicopter type collective pitch and cyclic pitch controls are used to control prop-rotor thrust and the moments generated by the rotor.

At all times all of the control surfaces on the VTOL airplane unit—ailerons 96, elevator 99 (horizontal tail), rudder 101 and side force generator 97 remain connected to the pilot's controls and move when the control stick and rudder pedals are moved. The LTA unit's rudders 9 also are connected to the pilot's controls and operate at all times. During vertical and low speed flight, when the airplane unit's longitudinal axis is near vertical, as in FIG. 15, side force is obtained by longitudinally tilting the airplane unit, increasing thrust to maintain constant vertical force and rotating the airplane unit and the bifurcated cable assembly to which it is attached about the axis 111 established by the line connecting the upper and lower swivels 108 and 108a of the bifurcated cable system. In the near-vertical attitude the airplane unit's rudders 101 cannot rotate the airplane about its yaw axis due to the restraining effect of the bifurcated cables on lateral tilting of the airplane. The side force generator 97 provides only a relatively small side force at this time because it has only the prop-rotor slipstream velocity available; the inclined prop-rotor thrust is the principal means for providing the needed side force.

During forward flight when the airplane unit's longitudinal axis is tilted substantially down but still is well above horizontal, use of lateral cyclic control on prop-rotor 93 plus rudders 101 and ailerons 96 produces the moment to rotate the airplane unit 92 and bifurcated cable assembly 106–107 thereby providing the side force to turn the hybrid aircraft assembly. The side force generator 97 action aids the turning as do the LTA unit's rudders 9.

In cruising flight, with the airplane unit's longitudinal axis near horizontal, turning of the airplane unit 92 and bifurcated cable assembly 106–107 is obtained through use of prop-rotor lateral cyclic control and use of the rudder 101. The side force thus produced is increased further through use of the side force generator 97.

During vertical and low speed flight, the pendular motions of the VTOL airplane unit and the load suspended below it are damped and controlled automatically through activation of the airplane unit's controls by using motion sensing inputs into the autopilot.

The twin prop-rotor VTOL airplane unit of FIG. 17 is used in much the same way as the single rotor airplane unit of FIG. 14 but there are differences in how some of the control moments are created. The twin prop-rotor airplane unit with oppositely rotating rotors 121 and 121a is a balanced torque type and requires left and right hand rotors and gear drives. It is entirely feasible to use two rotors having the same rotational sense even though the torques are additive. By using differential longitudinal tilt of the rotors the torque reaction of the airplane unit can be counteracted. While such an arrangement complicates the actions of the autopilot system, it permits the use of identical, existing helicopter rotors, controls and gear drives, suitably modified, to act as prop-rotor propulsion systems.

The twin fuselages 119 and 119a of the airplane unit in FIG. 17 are rigidly attached to wing 117. Each prop-rotor is mounted on the nose of its fuselage and driven by an engine through reduction gearing located in the forward section of the fuselage. Fuel tanks and components of the flight control system are located in the fuselage aft of the engines. As in the single prop-rotor type airplane unit, the twin prop-rotors 121 and 121a are equipped with helicopter type collective and cyclic pitch control systems. These are used to change rotor thrust, tip-path-plane angle and to produce pitching and yawing moments at the hubs. Simultaneous application of longitudinal cyclic control in the same direction on each rotor provides pitching moment about the lateral or trunnion axis 116 of the airplane unit. Use of differential cyclic control creates a rolling moment about the airplane unit's longitudinal axis. Simultaneous application of lateral cyclic control in the same direction produces a yawing moment on the airplane unit as does differential collective pitch change. These moments are augmented by the control surfaces—ailerons 118, if provided, and horizontal tails 122 and 122a and rudders 124 and 124a. Also the horizontal tails 122 and 122a can be used as elevons, combining elevator and aileron functions into these units.

The turning axis of the airplane unit is the major axis of the trunnion strut 112, that is, the line 112a connecting the upper cable attachment 113 and lower cable attachment 113a. During vertical and low speed flight, when the airplane unit's longitudinal axis is near vertical, application of differential longitudinal cyclic control to prop-rotors 121 and 121a causes the airplane unit to rotate about axis 112a. Longitudinal cyclic control in the same direction, in conjunction with elevator action, tilts the airplane unit about trunnion axis 116. Combining these actions produces the desired horizontal force vector for maneuvering the airplane unit, payload pod 3 and payload 4 suspended below, with the LTA unit 1 subsequenly following any prolonged translational movement of these units.

With the airplane unit tilted down substantially from the vertical, up to 90 degrees (near horizontal), turning about axis 112a is produced by applying differential collective pitch change to the prop-rotors 121 and 121a plus the action of the rudders 124 and 124a. At intermediate tilt angles the ailerons 118, if any, and elevons 124 and 124a aid in turning the airplane unit about axis 112a. If necessary, the turning moment can be increased by use of lateral cyclic pitch applied in the same direction on both prop-rotors 121 and 121a and also by use of differential longitudinal cyclic pitch.

The wing 117 has the minimal area and chord necessary to provide a structure to carry the loads imposed on it while having an airfoil shape which gives low drag in cruise and high speed flight. The wing is divided into two halves which are connected by tubular spar 114 at the middle. The spar acts as the trunnion shaft passing through the bearings 115 in trunnion strut 112, designed to permit free rotation of the airplane unit about trunnion axis 116. The bearings 115 are spaced sufficiently far apart to provide substantial lateral stiffness to keep trunnion strut 112 from deflecting into the paths of the rotor blade tips. The trunnion strut 112 serves the important function of carrying the cable tension through the airplane unit and of keeping the cables 6 and 7 away from the blade tips. Trunnion strut 112 extends to just beyond the plane of the prop-rotors.

The fuel line in cable 7 is similar to that shown in FIG. 1 fuel line 39a and attaches to a trunnion strut-mounted fuel line which has a flexible section capable of bending and not interfering with the airplane unit's tilting motion. The flexible section is located near wing spar 114 and connects to lines projecting from the wing spar and terminating at the engines in the fuselages. Fuel for the LTA unit 1 is carried through a line attached to trunnion strut 112. This line connects with the lines in lower cable 7 and upper cable 6. The electric lines use a similar scheme to carry electric current and control signals to the airplane unit and LTA unit 1.

The cross-shaft connecting the gear drive systems of the two prop-rotors 121 and 121a passes through the wing 117 and tubular spar 114 at the wing's center. The cross-shaft is designed to permit either engine to drive both rotors in the event of a failure of one engine. Normally, the cross-shaft and associated gearing operate under small torque loads, but the shaft and gearing must be capable of handling existing drive loads when one engine powers both prop-rotors.

Side force generators similar to that used on the single prop-rotor airplane unit, item 97, FIG. 14, can be mounted on each fuselage 119 and 119a in the prop-rotor slipstream.

Figure 18:
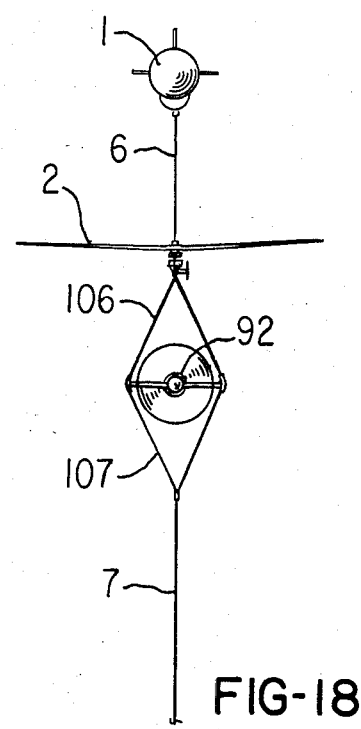
FIG. 18 is a frontal view of the hybrid aircraft assembly in translational flight using a combination of a helicopter unit and a single prop-rotor VTOL airplane unit mounted in tandem on the Lifting Line.
Figure 19:
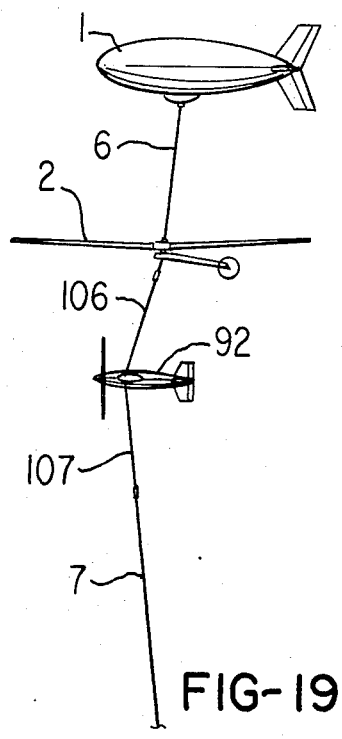
FIG. 19 is a side elevation of the hybrid aircraft assembly in FIG. 18.

It will be understood that the invention can use a mixture of VTOL type heavier-than-air units in tandem on the Lifting Line and even a mixture of VTOL and non-VTOL heavier-than-air units. FIGS. 18 and 19 show a hybrid aircraft system comprised of a LTA unit 1, a helicopter unit 2, and a single prop-rotor tilting VTOL airplane unit 92. Not shown are payload pod 3 and payload 4 of FIG. 1. This arrangement permits the use of a large diameter helicopter rotor which, when the buoyant lift is less than the flight weight, acts like a conventional helicopter rotor, providing both lift and translational propulsive force. The VTOL airplane unit 92 is sized to provide the propulsive force needed to propel the hybrid aircraft system at the required cruise speed with payload unloaded. By lifting at least its own weight during vertical and low speed flight the VTOL airplane 92 does not cause an increase in the size of the LTA unit 1 or helicopter unit 2. When the buoyant lift exceeds the flight weight of the hybrid aircraft, the helicopter unit 2 provides negative thrust as described earlier, but does not need to tilt aftward to provide translational movement. Such movement is provided by the VTOL airplane unit 92, the helicopter unit need provide only negative lift.

Under certain circumstances, additional LTA units, similar to unit 1, may be desired to increase buoyant lifting capacity. In such cases, these additional units may be interconnected to unit 1 by placing it above or below the unit 1 by means of another flexible tension member similar to bifurcated assembly shown in in FIG. 14.

If a conventional type non-VTOL airplane unit, not shown, is substituted for the VTOL airplane unit, some reduction in complexity will result but the helicopter unit 2 or the LTA unit 1, or both, must have increased lifting capability to carry the weight of the non-VTOL airplane unit. Such a unit can be an adaptation of an existing airplane without an undercarriage and with fuselage and wings modified or replaced to reduce the airplane unit's weight.

The embodiments described above are exemplary, but other embodiments also are contemplated as being within the scope of the invention, as set forth in the following claims.

I claim:

1. An aerial load-lifting system having a plurality of aircraft units, one of said units comprising a lighter-than-air aircraft and another unit comprising a powered heavier-than-air aircraft, a first flexible tension member interconnecting said units, a second flexible tension member connected to and dependent from said heavier-than-air aircraft, said heavier-than-air aircraft being a vertical takeoff and landing type airplane having a pair of laterally disposed prop-rotors interconnected by a rigid member, a connecting member interconnecting said flexible tension members, and said rigid member pivotally connected to said connecting member permitting tilting of said aircraft about a horizontal axis.

2. The system of claim 1 in which said interconnecting member is an elongated rigid bar.

3. The system of claim 1 in which said rigid member is an aerodynamic lifting surface.

4. An aerial load-lifting system having a plurality of aircraft units, one of said units comprising a lighter-than-air aircraft and another unit comprising a powered heavier-than-air aircraft, said units interconnected by a flexible tension member; further comprising a second flexible tension member dependent from said heavier-than-air aircraft and so connected thereto as to permit tension forces in said first and second flexbile tension members to act through prescribed points on said heavier-than-air aircraft for any longitudinal angle of said flexible tension members with respect to said heavier-than-air aircraft during operation; said heavier-than-air aircraft being a vertical takeoff and landing type of airplane mounted concentrically with said first and second flexible tension members, said flexible tension members having bifurcated sections, said airplane having a lateral member, and means mounted at the outer extremities of said lateral member, said bifurcated sections attached to said means to permit tilting about the axis of said lateral member, said concentric mounting permitting longitudinal tilting of said aircraft about its horizontal axis and rotation in azimuth.

5. The system of claim 4 in which said lateral member is an aerodynamic lifting surface.

6. The system of claim 4 in which said airplane has a single lifting prop-rotor.

7. The system of claim 4 in which said airplane has a pair of counter-rotating prop-rotors.

8. The method of lifting and transporting a payload by means of an aerial system including a lighter-than-air aircraft and a heavier-than-air aircraft wherein said heavier-than-air aircraft is a vertical takeoff and landing type aircraft, comprising the steps of locating said lighter-than-air aircraft substantially above said heavier-than-air aircraft, interconnecting said lighter-than-air aircraft and heavier-than-air aircraft by means of a first flexible tension member, suspending said payload below said heavier-than-air aircraft by means of a second flexible tension member, providing means on said heavier-than-air aircraft for causing the tension forces in said tension members to pass approximately through prescribed points on said heavier-than-air aircraft for any longitudinal angle between said first and second flexible tension members during operation, providing a pair of laterally disposed prop-rotors on said vertical takeoff and landing type aircraft, interconnecting said prop-rotors by means of a rigid member, interconnecting said flexible tension members by means of a connecting member, pivotally connecting said rigid member to said connecting member to permit tilting of said vertical takeoff and landing type aircraft about a horizontal axis, and lifting and transporting said payload while maneuvering said system with a minimum of influence by said lighter-than-air aircraft.

9. The method lifting and transporting a payload by means of an aerial system including a lighter-than-air aircraft and a heavier-than-air aircraft, comprising the steps of locating said lighter-than-air aircraft substantially above said heavier-than-air aircraft, interconnecting said lighter-than-air aircraft and heavier-than-air aircraft by means of a first flexible tension member, suspending said payload below said heavier-than-air aircraft by means of a second flexible tension member, providing means on said heavier-than-air aircraft for causing the tension forces in said tension members to pass approximately through prescribed points on said heavier-than-air aircraft for any angle between said first and second flexible tension members during operation, locating said heavier-than-air aircraft concentrically of said first and second tension members, longitudinally tilting said heavier-than-air aircraft about its horizontal axis and rotating it in azimuth, providing bifurcated sections on said flexible tension members, providing a lateral member on said heavier-than-air aircraft, providing mounting means at the outer extremities of said lateral member, attaching said bifurcated sections to said mounting means to permit said tilting, and lifting and transporting said payload while maneuvering said system with a minimum of influence by said lighter-than-air aircraft.

* * * * *